US012578564B2

(12) United States Patent
    Ha

(10) Patent No.: US 12,578,564 B2
(45) Date of Patent: Mar. 17, 2026

(54) OPTICAL DEVICE FOR AUGMENTED REALITY HAVING OPTICAL STRUCTURE ARRANGED IN STRAIGHT LINE AND METHOD FOR MANUFACTURING OPTICAL MEANS

(71) Applicant: LETINAR CO., LTD, Anyang-si (KR)

(72) Inventor: Jeong Hun Ha, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 311 days.

(21) Appl. No.: 18/044,343

(22) PCT Filed: Jun. 17, 2021

(86) PCT No.: PCT/KR2021/007586
    § 371 (c)(1),
    (2) Date: Mar. 7, 2023

(87) PCT Pub. No.: WO2022/055083
    PCT Pub. Date: Mar. 17, 2022

(65) Prior Publication Data
    US 2023/0333358 A1      Oct. 19, 2023

(30) Foreign Application Priority Data

Sep. 9, 2020    (KR) ........................ 10-2020-0115455

(51) Int. Cl.
    *G02B 17/00*       (2006.01)
    *B29D 11/00*       (2006.01)
    *G02B 27/01*       (2006.01)
(52) U.S. Cl.
    CPC ........ *G02B 17/006* (2013.01); *B29D 11/0073* (2013.01); *G02B 27/0172* (2013.01); *B29K 2995/003* (2013.01)

(58) Field of Classification Search
    CPC .............. G02B 17/006; G02B 27/0172; G02B 2027/013; G02B 27/0081;
        (Continued)

(56) References Cited

U.S. PATENT DOCUMENTS 11,543,583 B2 *   1/2023   Eisenfeld ............. G02B 6/0035
    2015/0177519 A1   6/2015   Cakmakci et al.
        (Continued)

FOREIGN PATENT DOCUMENTS

EP          4053615 A1    9/2022
    EP          4231080 A1    8/2023
        (Continued)

*Primary Examiner* — Collin X Beatty
(74) *Attorney, Agent, or Firm* — Rabin & Berdo, P.C.

(57)          ABSTRACT

The present invention provides an optical device for augmented reality having an optical structure arranged in a straight line, the optical device including: a reflective means configured to transfer augmented reality image light, output from an image output unit, to the pupil of a user's eye by reflecting the augmented reality image light toward the pupil, thereby providing an image for augmented reality to the user; and an optical means configured such that the reflective means is buried and disposed therein, and also configured to transmit at least part of real object image light, output from a real object, therethrough toward the pupil of the user's eye; wherein the optical unit has a first surface through which the augmented reality image light and the at least part of the real object image light are output and a second surface which the real object image light enters.

20 Claims, 31 Drawing Sheets

20 ... 21, 22, 23, 24, 25, 26, 27, 28, 29
20A ... 26, 27, 28, 29
20B ... 21, 22, 23, 24,25

(58) Field of Classification Search

CPC .... G02B 2027/0125; G02B 2027/0127; G02B 2027/0178; G02B 2027/0174; G02B 5/003; G02B 5/08; G02B 5/32; G02B 17/06; B29D 11/0073; B29D 11/0074; B29K 2995/003

See application file for complete search history.

(56) References Cited

U.S. PATENT DOCUMENTS

| | | | | |
|---|---|---|---|---|
| 2016/0313557 | A1* | 10/2016 | Schmidt | G02B 27/0172 |
| 2018/0373042 | A1* | 12/2018 | Rudolph | G02B 27/0172 |
| 2019/0041645 | A1* | 2/2019 | Wu | G02B 6/132 |
| 2019/0064526 | A1* | 2/2019 | Connor | G02B 6/0073 |
| 2019/0187541 | A1* | 6/2019 | Yoshida | G03B 21/142 |
| 2019/0227215 | A1* | 7/2019 | Danziger | G02B 6/002 |
| 2020/0089004 | A1* | 3/2020 | Connor | G02B 27/0176 |
| 2020/0183169 | A1* | 6/2020 | Peng | G02B 6/0055 |
| 2020/0225400 | A1* | 7/2020 | Stannard | G02B 27/14 |
| 2021/0409675 | A1* | 12/2021 | Min | H04N 13/344 |
| 2022/0269098 | A1* | 8/2022 | Danziger | G02B 27/0081 |

FOREIGN PATENT DOCUMENTS

| | | | |
|---|---|---|---|
| JP | 2014-112245 | A | 6/2014 |
| JP | 2018-32049 | A | 3/2018 |
| JP | 2018-54782 | A | 4/2018 |
| JP | 2018-109738 | A | 7/2018 |
| JP | 2018-165741 | A | 10/2018 |
| JP | 2019109435 | A | 7/2019 |
| KR | 1020150026486 | A | 3/2015 |
| KR | 101660519 | B1 | 9/2016 |
| KR | 1020180028339 | A | 3/2018 |
| KR | 1020190063442 | A | 6/2019 |
| KR | 1020190106879 | A | 9/2019 |
| KR | 1020200009166 | A | 1/2020 |
| KR | 102102888 | B1 | 4/2020 |
| KR | 102192942 | B1 | 12/2020 |
| KR | 1020210081517 | A | 7/2021 |
| KR | 102323201 | B1 | 11/2021 |
| WO | 2011058156 | A1 | 5/2011 |
| WO | 2020123528 | A1 | 6/2020 |
| WO | 2020126672 | A1 | 6/2020 |
| WO | 2022044001 | A1 | 3/2022 |

* cited by examiner

20 ... 21, 22, 23, 24, 25, 26, 27, 28, 29
20A ...21, 22, 23, 24
20B ...25, 26, 27, 28, 29

20 ... 21, 22, 23, 24, 25, 26, 27, 28, 29
20A ... 26, 27, 28, 29
20B ... 21, 22, 23, 24,25

OPTICAL DEVICE FOR AUGMENTED REALITY HAVING OPTICAL STRUCTURE ARRANGED IN STRAIGHT LINE AND METHOD FOR MANUFACTURING OPTICAL MEANS

TECHNICAL FIELD

The present invention relates to an optical device for augmented reality and a method for manufacturing an optical means, and more particularly to an optical device for augmented reality in which an optical element for transferring the augmented reality image light, output from an image output unit, to the pupil is formed in a straight arrangement structure, thereby improving optical efficiency and simplifying a manufacturing process, and a method for manufacturing an optical means.

BACKGROUND ART

Augmented reality (AR) refers to technology that superimposes a virtual image, provided by a computer or the like, on a real image in the real world and then provides a resulting image, as is well known.

In order to implement augmented reality, there is required an optical system that allows a virtual image, generated by a device such as a computer, to be superimposed on an image in the real world and then allows a resulting image to be provided. As such an optical system, there is known a technology using an optical means such as a prism for reflecting or refracting a virtual image by using a head-mounted display (HMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a technology using a configuration such as a prism capable of adjusting focal length for a virtual image and a technology for electrically controlling a variable focal lens in response to a change in focal length. However, these technologies also have a problem in that a user needs to perform a separate operation in order to adjust focal length or in that hardware such as a separate processor for controlling focal length and software are required.

In order to overcome the above-described problems of the conventional technologies, the present applicant has developed a device capable of implementing augmented reality by projecting a virtual image onto the retina through the pupil using a reflective unit having a size smaller than that of a human pupil, as described in patent document 1.

FIG. 1 is a diagram showing an optical device 100 for augmented reality as disclosed in patent document 1.

The optical device 100 for augmented reality shown in FIG. 1 includes an image output unit 10, a reflective unit 20, an optical means 30, and a frame unit 40.

The optical means 30 is a means for transmitting at least part of real object image light, which is image light output from a real object, therethrough, and may be, e.g., a lens of eyeglasses. The reflective unit 20 is buried and disposed inside the optical means 30. Furthermore, the optical means 30 also serves to transmit the augmented reality image light, output from the image output unit 10 and reflected by the reflective unit 20, therethrough in order to transfer the augmented reality image light to the pupil.

The frame unit 40 is a means for fixing and supporting both the image output unit 10 and the optical means 30, and may be, e.g., an eyeglass frame.

The image output unit 10 is a means for outputting augmented reality image light, which is image light corresponding to an image for augmented reality. For example, the image output unit 10 may include a small-sized display device configured to display an image for augmented reality on a screen and radiate augmented reality image light, and a collimator configured to collimate the image light, radiated from the display device, into parallel light.

The reflective unit 20 reflects image light corresponding to an image for augmented reality, output from the image output unit 10, toward a pupil of a user, thereby providing the image for augmented reality.

The reflective unit 20 of FIG. 1 is formed to have a size smaller than that of the pupil size of people, i.e., 8 mm or less. By forming the reflective unit 20 to be smaller than the pupil size as described above, the depth of field for light entering the pupil through the reflective unit 20 may be made almost infinite, i.e., considerably deep.

In this case, the depth of field refers to a range within which an image for augmented reality is recognized as being in focus. When the depth of field increases, it means that a focal distance for an image for augmented reality increases. Accordingly, even when a user changes the focal distance for the real world while gazing at the real world, the user always recognizes an image for augmented reality as being in focus regardless of such a change. This may be viewed as a type of pinhole effect. Accordingly, even when the user changes the focal length while gazing at a real object present in the real world, the user can always view a clear virtual image for an image for augmented reality.

Furthermore, as a conventional optical device for augmented reality, there is known a technology using an optical means such as a prism for reflecting or refracting a virtual image by using a head-mounted display (HMD) or a glasses-type device.

FIGS. 2 and 3 show an example of an optical system used in a conventional augmented reality implementation device.

Referring to FIG. 2, there is used a configuration in which the augmented reality image light used to provide a virtual image is output from a display device (not shown) or the like, is reflected on an inner surface of an optical means, and is then incident on an area (an eye box) where a user's pupil is located. In this case, part of the augmented reality image light output from the inner surface (exit pupil) of the optical means does not enter the eye box and is unused as shown in FIG. 2, which becomes a factor that degrades optical efficiency.

The reason for this is that as shown in FIG. 3, when total internal reflection occurs inside the optical means, light is output in all directions from everywhere in the exit pupil, so that some of the augmented reality image light incident through the optical means appropriately enters the eye box (the light is marked by o) whereas some of the augmented reality image light is output in directions other than the directions toward the eye box (the light is marked by x).

As described above, in the conventional augmented reality optical device, part of the augmented reality image light output from the image output unit is not transferred to the eye box, which acts as a factor that degrades the optical efficiency at which augmented reality image light is transferred to the pupil.

Meanwhile, the present applicant has filed a technology for solving the problems described in conjunction with FIGS. 2 and 3 based on the basic principle of the optical device 100 for augmented reality shown in FIG. 1.

FIG. 4 is a diagram showing an optical device 200 for augmented reality disclosed in Korean Patent Application No. 10-2019-0173543 (filed on Dec. 24, 2019) filed by the present applicant.

The optical device 200 for augmented reality shown in FIG. 4 includes an image output unit 10, a reflective means 20, and an optical means 30.

Referring to FIG. 4, an image output unit 10 is a means for outputting augmented reality image light, which is image light corresponding to an image for augmented reality. The image output unit 10 may include a display device 11 configured to display an image for augmented reality on a screen and a collimator 12 configured to output collimated light obtained by collimating the augmented reality image light output from the display device 11.

The reflective means 20 is a means for transferring the augmented reality image light, output from the image output unit 10, to the pupil 50 of a user's eye by reflecting the augmented reality image light toward the pupil 50. The reflective means 20 includes a plurality of reflective units 21 to 29 that are buried and disposed inside the optical means 30.

The individual reflective units 21 to 29 are appropriately arranged inside the optical means 30 by taking into consideration the locations of the image output unit 10 and the pupil 50 in order to transfer the augmented reality image light, transferred to the reflective units 21 to 29, to the pupil 50 of a user by reflecting the augmented reality image light toward the pupil 50.

Meanwhile, as described above with reference to FIG. 1, each of the reflective units 21 to 29 has a size smaller than the size of a human pupil, i.e., 8 mm or less, more preferably 4 mm or less, in order to obtain a pinhole effect by increasing the depth of field.

Furthermore, in FIG. 4, the reflective means 20 includes a first reflective unit group 20A composed of a plurality of reflective units 21 to 24 and a second reflective unit group 20B composed of a plurality of reflective units 25 to 29. The first reflective unit group 20A and the second reflective unit group 20B are buried inside the optical unit 30 so that the distance between the second reflective unit group 20B and the image output unit 10 is longer than the distance between the first reflective unit group 20A and the image output unit 10.

Furthermore, the reflective units 21 to 24 constituting the first reflective unit group 20A are buried and disposed inside the optical means 30 so that they are arranged closer to the first surface 31 of the optical means 30 as the distance from the image output unit 10 increases. The reflective units 25 to 29 constituting the second reflective unit group 20B are buried and disposed inside the optical means 30 so that they are arranged further from the first surface 31 of the optical means 30 as the distance from the image output unit 10 increases.

In other words, the reflective units 21 to 29 are arranged inside the optical means 30 to have a curved arrangement structure close to a "C" shape as a whole when viewed in the direction of the paper in FIG. 4, i.e., when viewed from a side of the optical means 30.

FIG. 5 is intended for illustrating the operation of the optical device 200 for augmented reality shown in FIG. 4. As shown in the drawing, it can be seen that the augmented reality image light output from the image output unit 10 is incident through the top of the optical means 30 serving as an input pupil, is reflected by total internal reflection on the first and second surfaces 31 and 32 of the optical means 30 twice, is reflected by the reflective units 21 to 25, and is transferred to an eye box through the first surface 31 of the optical means 30 acting as an exit pupil. In this case, the distance between the eye box where the pupil 50 can be located and the optical means 30 becomes an eye relief.

As shown in FIG. 5, it can be seen that the augmented reality image light output from the image output unit 10 is all transferred toward the eye box by the inclination angle and arrangement structures of the reflective units 21 to 25, so that the optical efficiency of the augmented reality image light can be remarkably improved.

However, the configuration shown in FIGS. 4 and 5 has a problem in that the manufacturing process is complicated.

FIG. 6 is a diagram illustrating a process of manufacturing the optical means 30 used in the optical device 200 for augmented reality of FIG. 5.

When viewed from a side, the optical means 30 of the optical device 200 for augmented reality shown in FIG. 5 has five reflective units 21 to 25 disposed therein. When the optical means 30 in which the five reflective units 21 to 25 are disposed is manufactured, a total of six substrates (bases) A to E are required.

In other words, the optical means 30 is manufactured using a method of forming each of the reflective units 21 to 25 on one substrate by a deposition method or the like and then adhering individual substrates to each other. As shown in FIG. 6, the individual substrates (bases) A to E need to be formed at the same relative angles as the respective reflective units 21 to 25 have with respect to the forward direction of the pupil so that the reflective units 21 to 25 are formed in a C-shaped curved arrangement structure. Therefore, there are problems in that the manufacturing process is complicated and the defect rate is high because the thicknesses of the substrates (bases) A to E are different from each other.

Patent Document 1

Korean Patent No. 10-1660519 (published on Sep. 29, 2016)

DISCLOSURE

Technical Problem

The present invention has been conceived to overcome the above-described problems, and an object of the present invention is to provide an optical device for augmented reality in which an optical element for transferring the augmented reality image light, output from an image output unit, to the pupil is formed in a straight arrangement structure, thereby improving optical efficiency and simplifying a manufacturing process, and also provide a method for manufacturing an optical means.

Technical Solution

In order to accomplish the above object, the present invention provides an optical device for augmented reality having an optical structure arranged in a straight line, the optical device including: a reflective means configured to transfer augmented reality image light, output from an image output unit, to the pupil of a user's eye by reflecting the augmented reality image light toward the pupil, thereby providing an image for augmented reality to the user; and an optical means configured such that the reflective means is buried and disposed therein, and also configured to transmit at least part of real object image light, output from a real object, therethrough toward the pupil of the user's eye; wherein the optical unit has a first surface through which the augmented reality image light reflected from the reflective means and the at least part of the real object image light are output toward the user's pupil, and a second surface which is opposite to the first surface and the real object image light enters; wherein the reflective means includes a plurality of reflective units buried and disposed inside the optical means; wherein, when the optical means is placed in front of the user's pupil and a forward direction from the pupil is set as an x axis, the image output unit is disposed outside or inside the optical means to be located on a straight line orthogonal to the x axis; and wherein, when any one of line segments passing between the first and second surfaces of the optical means while being parallel to a vertical line extending from the image output unit to the x axis along the x axis is set as a y axis and a line segment orthogonal to the x axis and the y axis is set as a z axis: at least two of the plurality of reflective units form a first reflective unit group disposed inside the optical means so that the centers thereof are located on a first straight line when the optical means is viewed from the outside toward a plane perpendicular to the z axis; at least two of the remaining reflective units excluding the reflective units forming the first reflective unit group among the plurality of reflective units form a second reflective unit group disposed inside the optical means so that the centers thereof are located on a second straight line that is not parallel to the first straight line when the optical means is viewed from the outside toward a plane perpendicular to the z axis; and the reflective units forming the first reflective unit group are disposed inside the optical means to be located closer to the second surface of the optical means as a distance from the image output part increases.

In this case, the reflective units constituting the second reflective unit group may have the same distance with respect to the second surface of the optical means regardless of the distance from the image output unit.

Furthermore, the reflective units constituting the second reflective unit group may be arranged closer to the second surface of the optical means as the distance from the image output unit decreases.

Furthermore, the first straight line and the second straight line may be included in any one plane perpendicular to the z axis.

Furthermore, it is preferable that the augmented reality image light output from the image output unit be directly transferred to the plurality of reflective units through the inside of the optical means or be reflected by total internal reflection on an inner surface of the optical means at least once and then transferred to the plurality of reflective units.

Furthermore, the reflective means may include a plurality of reflective means, and the plurality of reflective means may be arranged in parallel at intervals along the direction of the z-axis.

Furthermore, each of the reflective means may be arranged such that each of reflective units constituting each of the reflective means is located together with any one of reflective units constituting an adjacent reflective mean along an imaginary straight line parallel to the z axis.

Furthermore, each of the reflective means may be arranged such that each of reflective units constituting each of the reflective means is not located together with all reflective units constituting an adjacent reflective mean along an imaginary straight line parallel to the z axis.

Furthermore, the plurality of reflective units may be formed in bar shapes extending along imaginary straight lines parallel to the z axis.

Furthermore, the plurality of reflective units may be formed to extend longer than the length of the image output unit in the direction of the z axis when the optical device for augmented reality is viewed in the direction of the x axis.

Furthermore, the plurality of reflective means may be arranged inside the optical means so that there is present at least one reflective means for which the distances between the plurality of reflective units and the first surface of the optical means are not all the same.

Furthermore, at least some of the plurality of reflective units may each be formed of a half mirror or a refractive element.

Furthermore, at least some of the plurality of reflective units may each be coated with a material absorbing light without reflecting light on the surface thereof opposite to the surface thereof that reflects the augmented reality image light.

Furthermore, surfaces of at least some of the plurality of reflective units may each be formed as a curved surface.

Furthermore, at least some of the plurality of reflective units may each be formed of a diffractive optical element (DOE) or a holographic optical element (HOE).

According to another aspect of the present invention, there is provided a method for manufacturing the optical means of the above-described optical device for augmented reality, the method including: a first step of forming reflective units on a surface of a lower base substrate along a first direction; a second step of sequentially bonding and stacking a plurality of first substrates on the surface of the lower base substrate, and forming reflective units on a surface of each of the plurality of first substrates along a direction parallel to the first direction; a third step of, after the second step, sequentially bonding and stacking a plurality of second substrates on an uppermost one of the first substrates, and forming reflective units on a surface of each of the plurality of second substrates along a direction parallel to the first direction; a fourth step of forming an optical means base material by bonding and stacking an upper base substrate on an uppermost one of the second substrates; and a fifth step of forming an optical means by processing the optical means base material; wherein the second step includes forming reflective units on a surface of each of the first substrates so that a line connecting centers of reflective units formed on surfaces of the respective first substrates form a straight line when the first substrates are viewed from the outside toward a plane perpendicular to the first direction; wherein the third step includes forming reflective units on a surface of each of the second substrates so that a line connecting centers of reflective units formed on surfaces of the respectively second substrates form a straight line when the second substrates are viewed from the outside toward a plane perpendicular to the first direction; wherein the straight line connecting the centers of the reflective units formed on the first substrates and the straight line connecting the centers of the reflective units formed on the second substrates are not parallel to each other; and wherein the fifth step includes cutting the optical means base material in directions parallel to the first direction along two parallel straight lines that allow the reflective units to be all included therebetween when the optical means base material is viewed toward a plane perpendicular to the first direction.

In this case, the plurality of first substrates may have the same shape, and the plurality of second substrates may have the same shape.

Furthermore, the plurality of first substrates and the plurality of second substrates may have different shapes.

Furthermore, when the optical means base material is viewed toward a plane perpendicular to the first direction, the height of any one of both ends of the plurality of first substrates and both ends of the plurality of second substrates may be higher than that of the remaining end.

According to still another aspect of the present invention, there is provided an optical device for augmented reality having an optical structure arranged in a straight line, the optical device including: an optical element disposed inside an optical means to transfer augmented reality image light, output from an image output unit, toward the pupil of a user's eye, thereby providing an image for augmented reality to the user; and the optical means configured such that the optical element is buried and disposed therein, and also configured to transmit at least part of real object image light, output from a real object, therethrough toward the pupil of the user's eye; wherein the optical unit has a first surface through which the augmented reality image light transferred through the optical element and the at least part of the real object image light are output toward the user's pupil, and a second surface which is opposite to the first surface and the real object image light enters; wherein, when the optical means is placed in front of the user's pupil and a forward direction from the pupil is set as an x axis, the image output unit is disposed outside or inside the optical means to be located on a straight line orthogonal to the x axis; and wherein, when any one of line segments passing between the first and second surfaces of the optical means while being parallel to a vertical line extending from the image output unit to the x axis along the x axis is set as a y axis and a line segment orthogonal to the x axis and the y axis is set as a z axis: the optical element is a diffractive optical element (DOE) or a holographic optical element (HOE), and the optical element is formed in a single plane shape, and is disposed inside the optical means so that at least two straight lines that are not parallel to each other appear bent in a connected form when the optical means is viewed in the direction of the z axis.

In this case, the augmented reality image light output from the image output unit may be directly transferred to the optical element through the inside of the optical means, or may be reflected by total internal reflection on an inner surface of the optical means at least once and then transferred to the optical element.

Advantageous Effects

According to the present invention, there may be provided the optical device for augmented reality in which an optical element for transferring the augmented reality image light, output from an image output unit, to the pupil is formed in a straight arrangement structure, thereby improving optical efficiency and simplifying a manufacturing process, and the method for manufacturing an optical means.

BEST MODE

Embodiments according to the present invention will be described in detail below with reference to the accompanying drawings.

Figure 7:
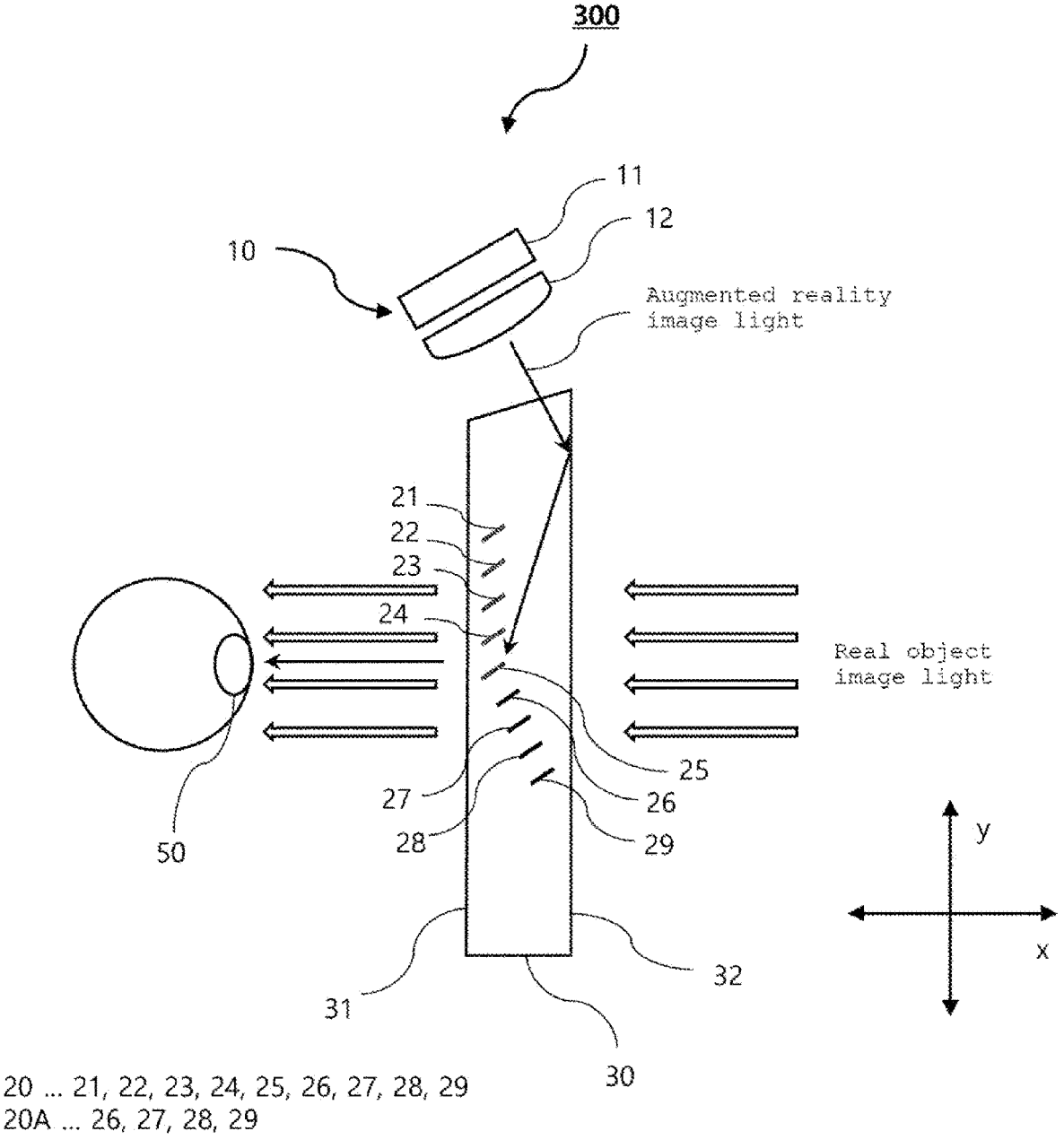
FIG. 7 is a side view when an optical device (300) for augmented reality is placed in front of the pupil (50)
Figure 8:
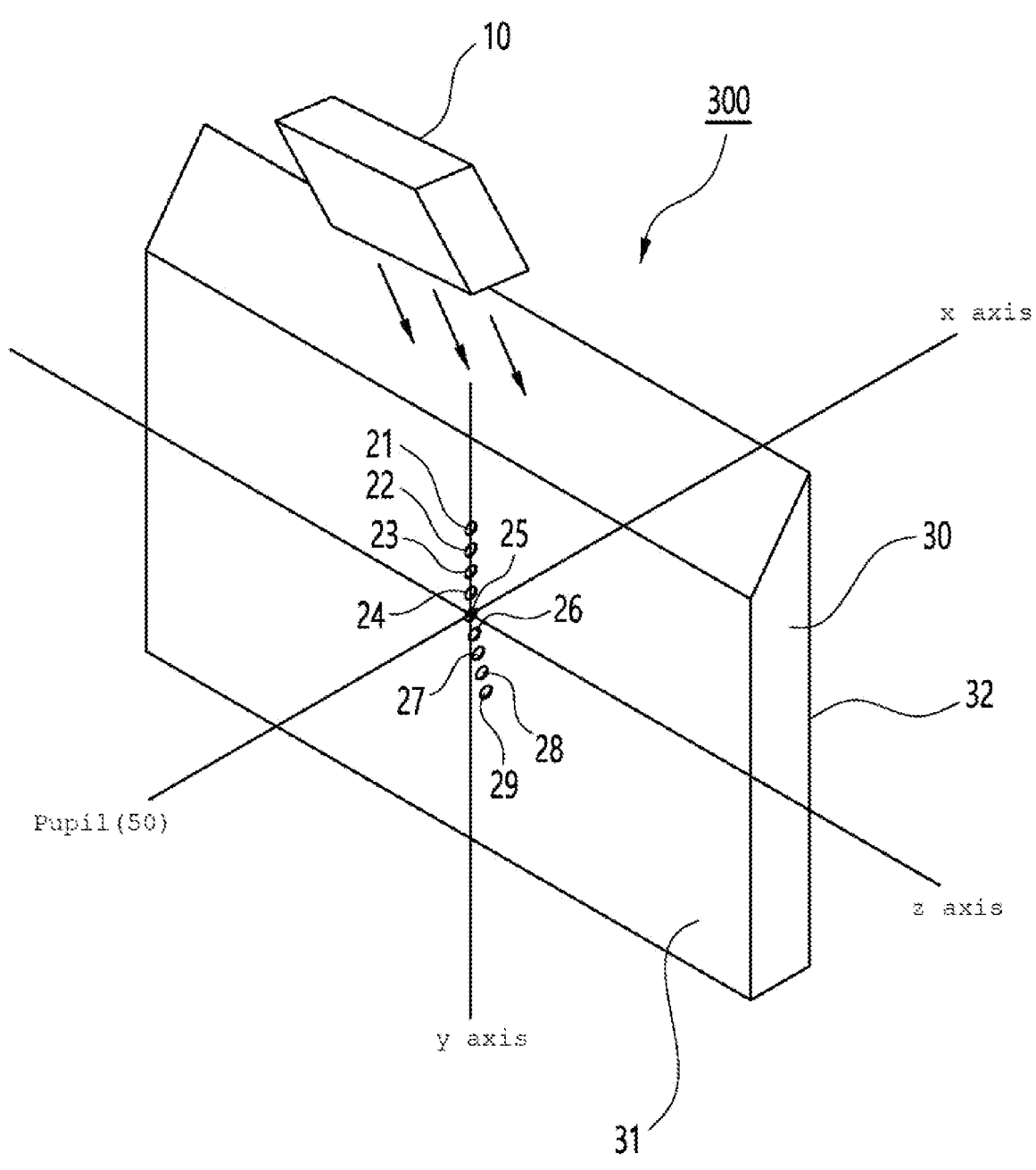
FIG. 8 is a perspective view when the optical device (300) for augmented reality is placed in front of the pupil (50)

FIGS. 7 and 8 are diagrams showing an optical device 300 for augmented reality having a straight arrangement optical structure (hereinafter simply referred to as the "optical device 300 for augmented reality") according to an embodiment of the present invention, in which FIG. 7 is a side view when the optical device 300 for augmented reality is placed in front of the pupil 50 and FIG. 8 is a perspective view when the optical device 300 for augmented reality is placed in front of the pupil 50.

Referring to FIGS. 7 and 8, the optical device 300 for augmented reality includes a reflective means 20 and an optical means 30.

An image output unit 10 is a means for outputting augmented reality image light, which is image light corresponding to an image for augmented reality, to the reflective means 20 of the optical means 30. For example, the image output unit 10 includes a display device 11 such as a small-sized LCD configured to output augmented reality image light, which is image light corresponding to an image for augmented reality, through a screen by displaying the image for augmented reality on the screen, and a collimator 12 configured to output collimated light obtained by collimating the augmented reality image light output from the display device 11.

In the image output unit 10, the collimator 12 is not essential and may be omitted. Furthermore, there may be used various other optical elements each composed of a combination of the collimator 12 and at least any one of another reflective means, a refractive means, and a diffractive means for transferring the augmented reality image light, output from the display device 11, toward the reflective means 20 of the optical means 30 by reflecting, refracting, or diffracting the augmented reality image light.

Since the image output unit 10 itself is not a direct target of the present invention and is known in prior art, a detailed description thereof will be omitted here.

Meanwhile, the image for augmented reality refers to a virtual image that is displayed on the screen of the display device 11 of the image output unit 10 and then transferred to a user's pupil 50 through the reflective means 20. It may be a still or moving image in the form of an image.

The image for augmented reality is output as augmented reality image light corresponding to an image for augmented reality from the image output unit 10 and transferred to a user's pupil 50 through the reflective means 20, thereby providing a virtual image to the user. At the same time, the user directly gazes at real object image light, which is image light output from a real object present in the real world, through the optical means 30, thereby being provided with augmented reality service.

Since the embodiment of FIGS. 7 and 8 shows a configuration in which total internal reflection is performed on an inner surface of the optical means 30 once, the image output unit 10 is disposed to output augmented reality image light from a location above the optical means 30 toward the second surface 32 of the optical means 30 as shown in FIGS. 7 and 8, and this is illustrative. When a total internal reflection structure is not used or total internal reflection is performed two or more times, the image output unit 10 may be disposed at a different location and at a different angle.

In other words, the image output unit 10 may be disposed at an appropriate location inside or outside the optical means 30 by taking into consideration whether a total internal reflection structure is employed, the number of times total internal reflection is performed, the location of the reflective means 20, the angle of the reflective means 20 with respect to the pupil, the location of the pupil 50, and/or the like.

Next, the reflective means 20 and the optical means 30 will be described.

First, the optical means 30 will be described.

The optical means 30 has the reflective means 20 buried and disposed therein, and is a means for transmitting at least part of the real object image light, output from a real object, therethrough toward the pupil 50 of a user's eye.

In this case, the fact that at least part of the real object image light is transmitted toward the pupil 60 implies that the optical transmittance of the real object image light does not necessarily need to be 100%.

The optical means 30 may be made of a lens made of glass or plastic material or other synthetic resin material, and may have various refractive indices and transparency.

The optical unit 30 has a first surface 31 through which the augmented reality image light reflected from the reflective means 20 and at least part of real object image light are output toward the user's pupil 50, and a second surface 32 which is opposite to the first surface 31 and the real object image light enters. The reflective means 20 is buried and disposed in the inner space between the first and second surfaces 31 and 32.

Although the first and second surfaces 31 and 32 of the optical means 30 are shown parallel to each other in FIGS. 7 and 8, this is illustrative and the first and second surfaces 31 and 32 may be configured not to be parallel to each other.

In addition, although both the first and second surfaces 31 and 32 of the optical means 30 are formed as flat surfaces in FIGS. 7 and 8, at least one of the first and second surfaces 31 and 32 may be formed as a curved surface. In other words, either one of the first and second surfaces 31 and 32 may be formed as a curved surface, or both the first and second surfaces 31 and 32 may be formed as curved surfaces.

In this case, the curved surface may be a concave surface or a convex surface. The concave surface refers to a surface that is concave because the central portion thereof is formed thinner than the edge portion thereof when the corresponding surface is viewed from the front, and the convex surface refers to a surface that protrudes convexly because the central portion thereof is formed thicker than the edge portion thereof when the corresponding surface is viewed from the front.

Next, the reflective means 20 will be described.

The reflective means 20 is a means for transferring augmented reality image light corresponding to an image for augmented reality, output from the image output unit 10, to the pupil 50 of a user's eye by reflecting the augmented reality image light toward the pupil 50, thereby providing the user with the image for augmented reality, which is a virtual image.

The reflective means 20 includes a plurality of reflective units 21 to 29 having a size of 4 mm or less that are buried and disposed inside the optical means 30. Hereinafter, the reflective means 20 collectively refers to all the plurality of reflective units 21 to 29 or all reflective unit groups 20A, 20B, and 20C to be described later.

The reflective units 21 to 29 are buried and disposed in the inner space between the first and second surfaces 31 and 32 of the optical means 30 as described above.

Meanwhile, although the augmented reality image light output from the image output unit 10 is shown as being reflected by total internal reflection on the second surface 32 of the optical means 30 once and being then transferred to the reflective units 21 to 29 in the embodiment of FIGS. 7 and 8 as described above, this is illustrative. It is obvious that the augmented reality image light output from the image output unit 10 may be directly transferred to the reflective units 21 to 29 through the inside of the optical means 30 without employing total internal reflection or may be reflected by total internal reflection on the inner surfaces of the optical means 30 twice or more and then transferred to the reflective units 21 to 29.

In the embodiment of FIGS. 7 and 8, the plurality of reflective units 21 to 29 are appropriately disposed inside the optical means 30 by taking into consideration the locations of the image output unit 10 and the pupil 50 so that the reflective units 21 to 29 transfer the augmented reality image light transferred to the individual reflective units 21 to 29 to the pupil 50 of a user by reflecting the augmented reality image light toward the pupil 50.

As in FIGS. 7 and 8, in the case of using a configuration in which the augmented reality image light output from the image output unit 10 is reflected by total internal reflection on the second surface 32 of the optical means 30 once and transferred to the reflective units 21 to 29, the inclination angles of the reflective units 21 to 29 are appropriately arranged by taking into consideration the location of the augmented reality image light incident from the image output unit 10 onto the second surface 32 of the optical means 30, the location of the augmented reality image light reflected by total internal reflection on the second surface 32 and then output to the reflective units 21 to 29, and the location of the pupil 50.

Figure 1:
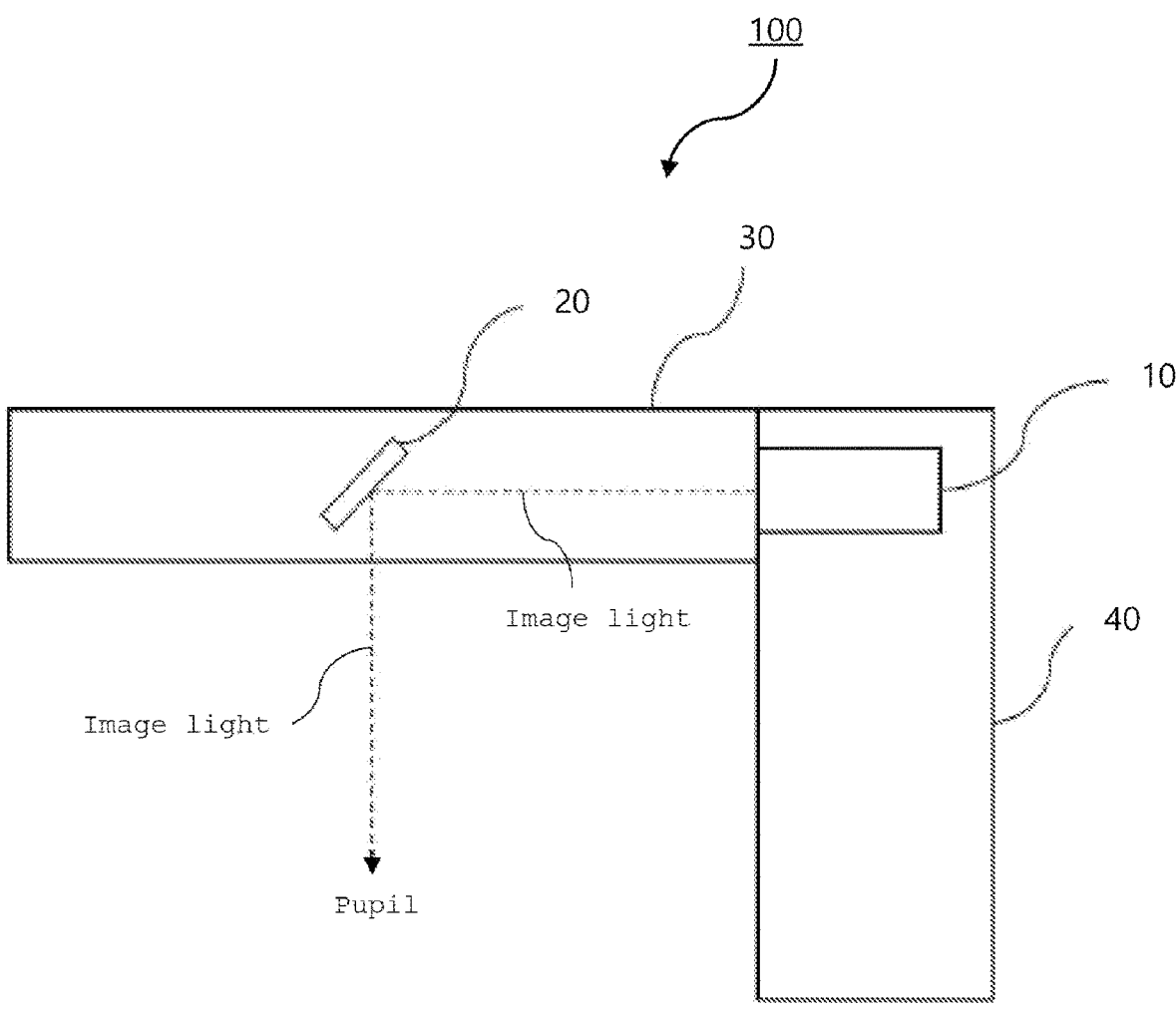
FIG. 1 is a diagram showing an optical device (100) for augmented reality as disclosed in patent document 1.
Figure 2:
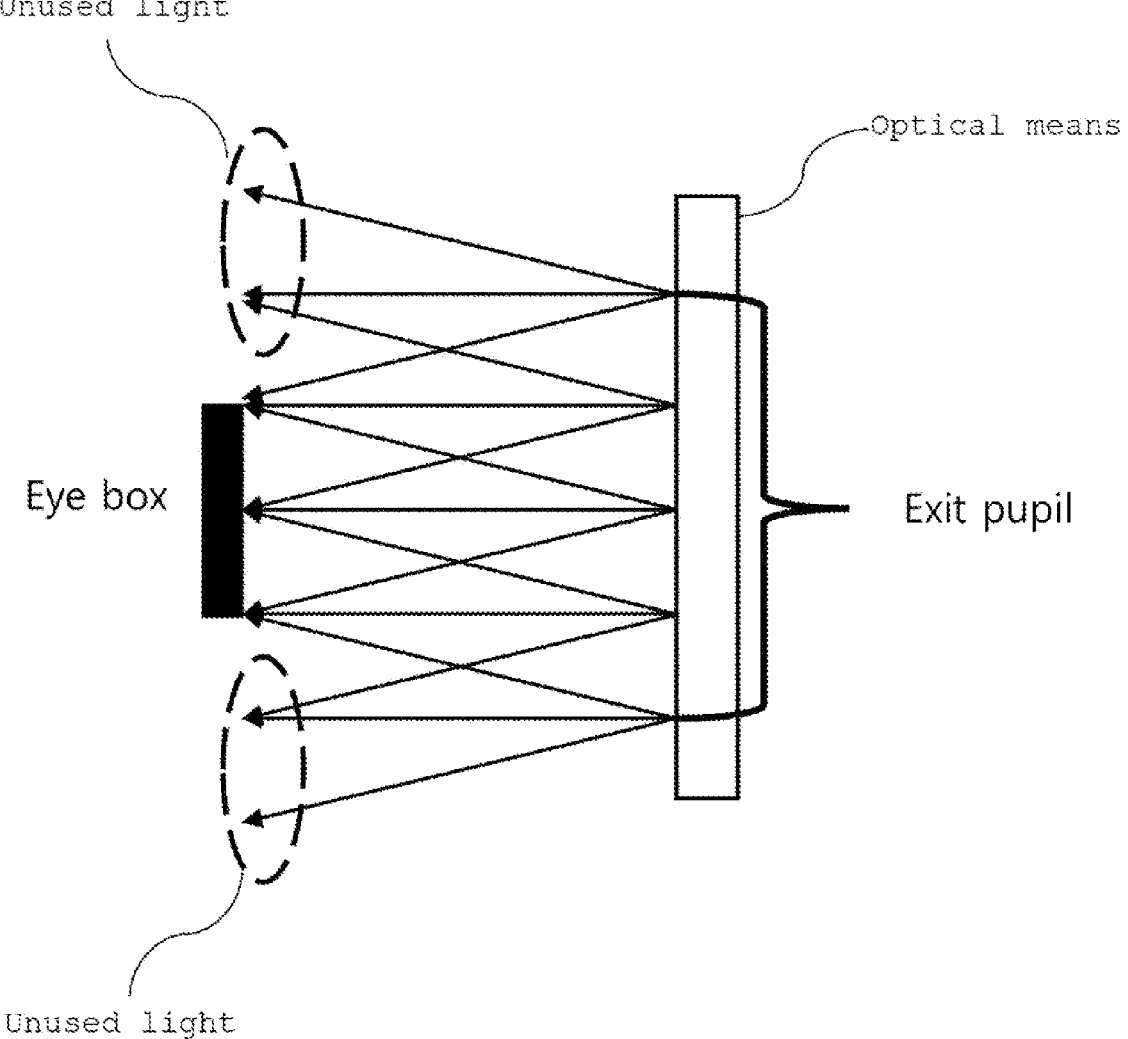
FIGS. 2 and 3 show an example of an optical system used in a conventional augmented reality implementation device.
Figure 3:
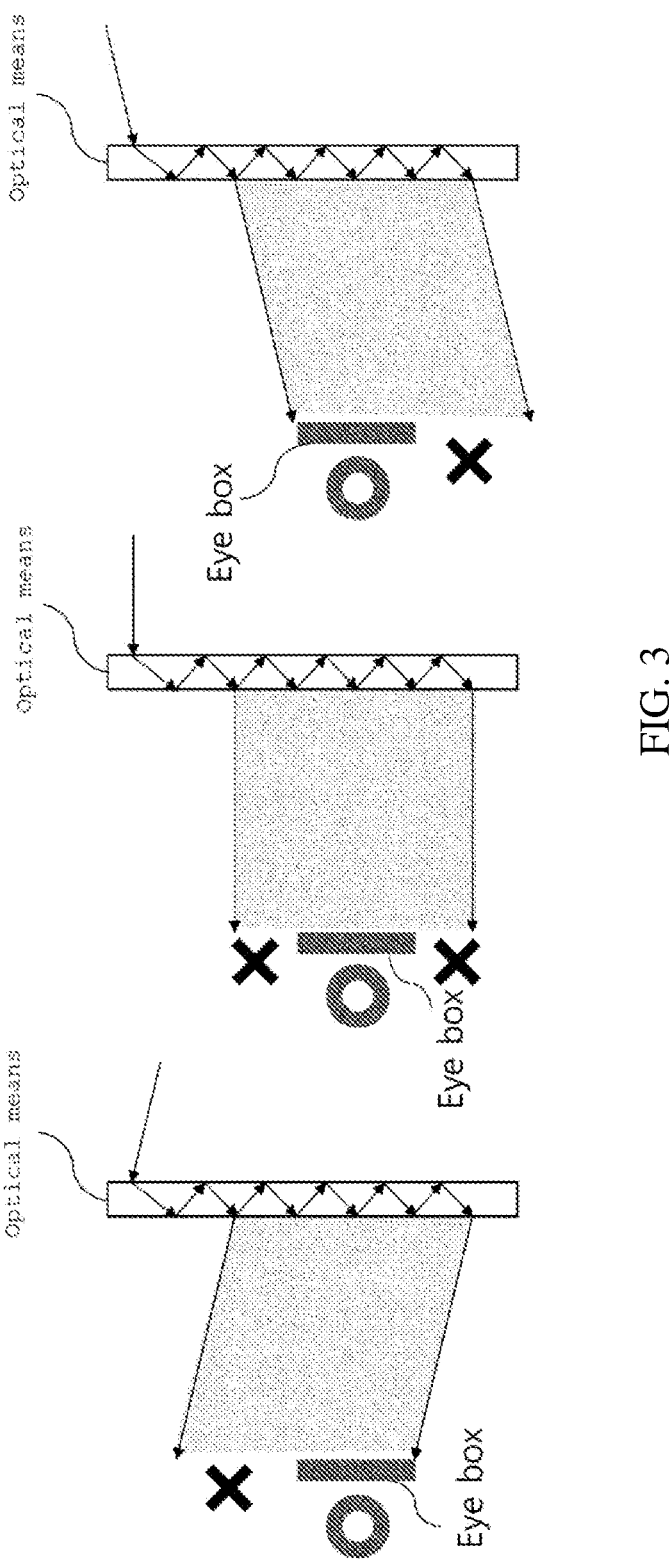
Figure 4:
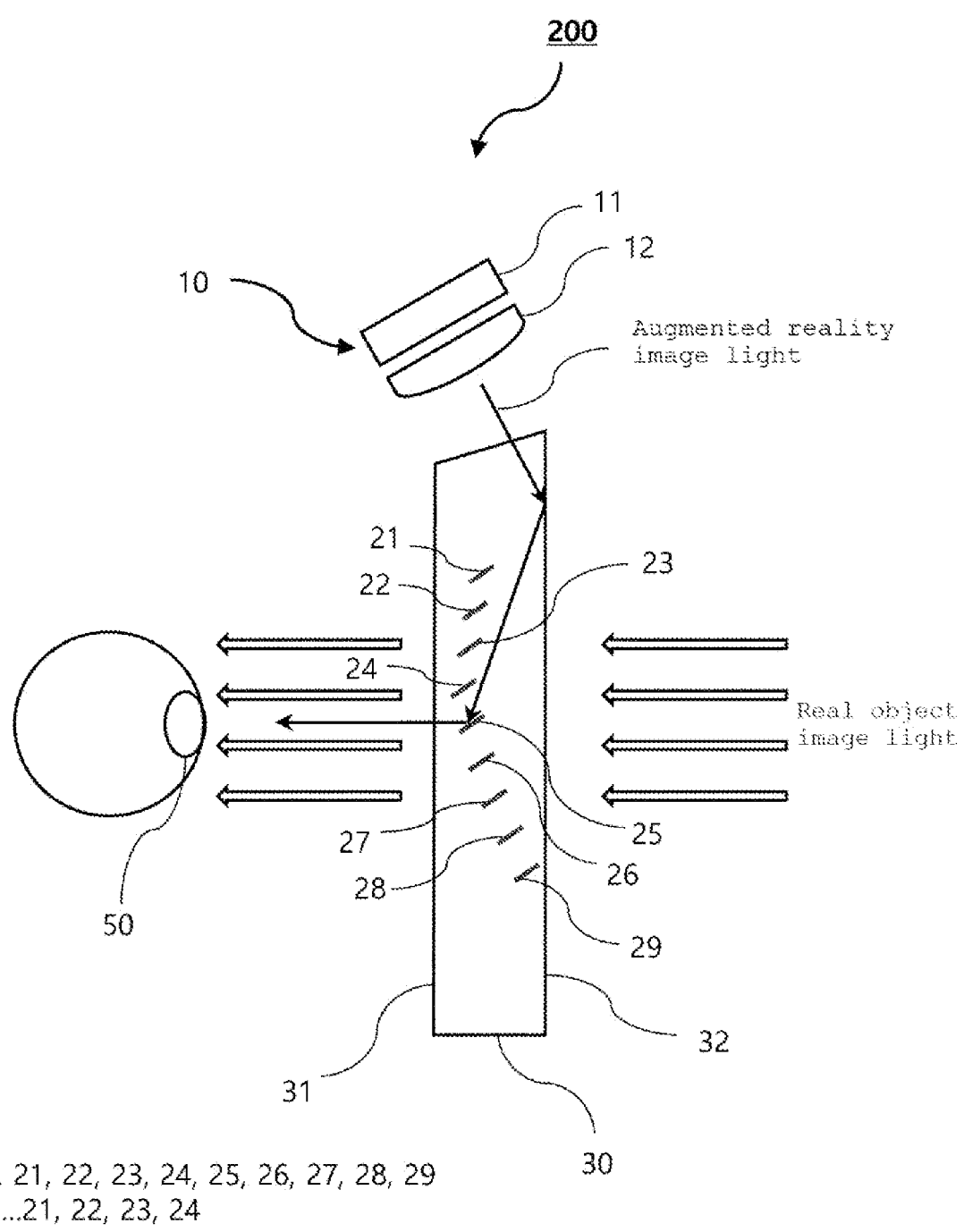
FIG. 4 is a diagram showing an optical device (200) for augmented reality disclosed in Korean Patent Application No. 10-2019-0173543 (filed on Dec. 24, 2019) filed by the present applicant.
Figure 5:
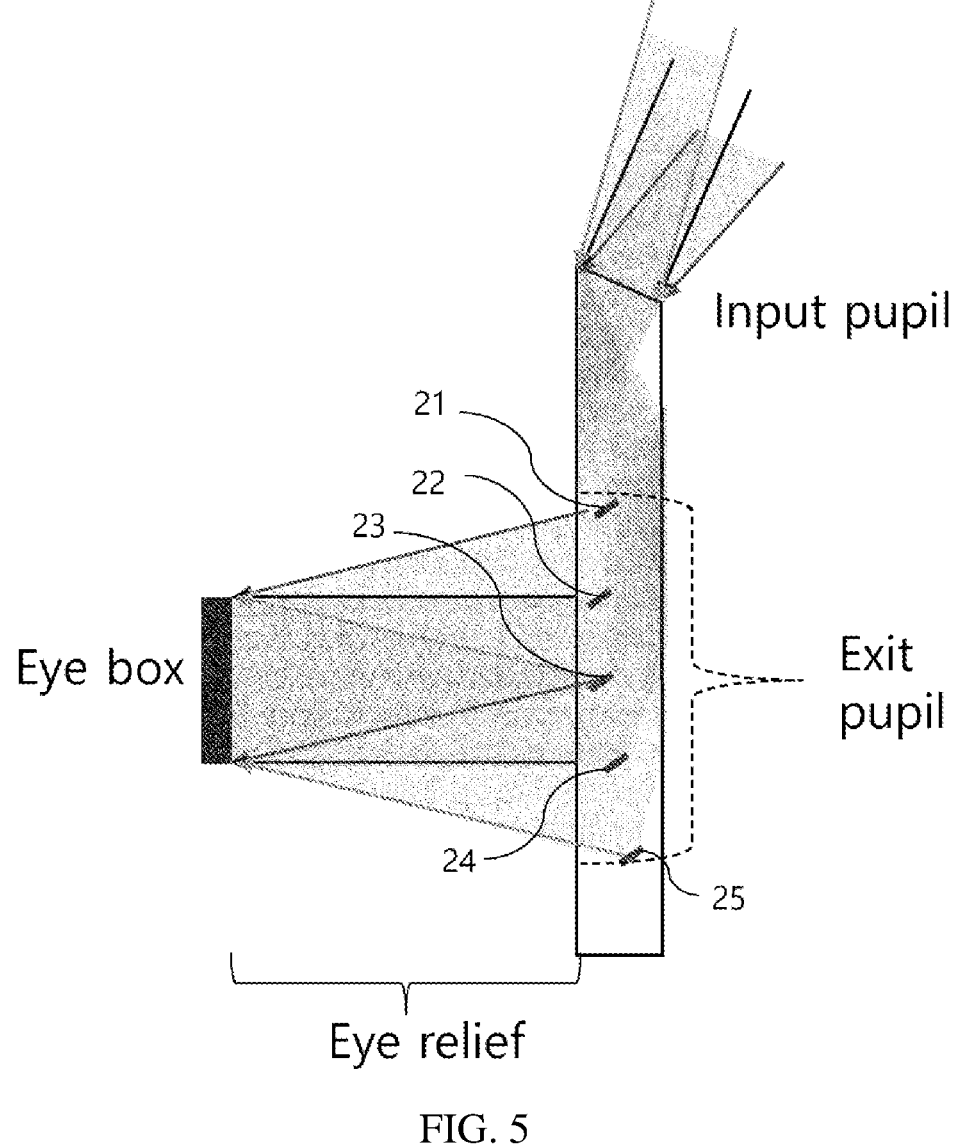
FIG. 5 is a diagram illustrating the operation of the optical device (200) for augmented reality shown in FIG. 4.

Meanwhile, as described above with reference to FIG. 1, each of the reflective units 21 to 29 is formed to have a size smaller than the size of a human pupil, i.e., 8 mm or less, more preferably 4 mm, in order to obtain a pinhole effect by increasing the depth of field.

In other words, each of the reflective units 21 to 29 is formed to have a size smaller than the common pupil size of people, i.e., 8 mm or less, more preferably 4 mm or less. Accordingly, the depth of field for the light incident onto the pupil 60 through each of the reflective units 21 to 29 may be made almost infinite, i.e., considerably deep. Therefore, there may be achieved a pinhole effect that allows an image for augmented reality to be always recognized as being in focus regardless of a change in the focal distance even when a user changes the focal distance for the real world while gazing at the real world.

In this case, the size of each of the reflective units 21 to 29 is defined as the maximum length between any two points on the edge boundary line of each of the reflective units 21 to 29.

Furthermore, the size of each of the reflective units 21 to 29 may be the maximum length between any two points on the edge boundary of an orthographic projection obtained by projecting each of the reflective units 21 to 29 onto a plane that is perpendicular to a straight line between the pupil 50 and the reflective units 21 to 29 and includes the center of the pupil 50.

Meanwhile, each of the reflective units 21 to 29 needs to be appropriately arranged in order not to block the transfer of augmented reality image light to the other reflective units 21 to 29. To this end, in the present embodiment, the reflective units 21 to 29 are configured and disposed as follows.

First, when the optical means 30 is placed in front of the user's pupil 50 and a forward direction from the pupil 50 is set as the x axis as shown in FIGS. 7 and 8, the image output unit 10 is disposed outside or inside the optical means 30 in order to be placed on a straight line orthogonal to the x axis.

In this case, when any one of the line segments passing between the first and second surfaces 31 and 32 of the optical means 30 while being parallel to a vertical line extending from the image output unit 10 to the x axis along the x axis is set as the y axis and a line segment orthogonal to the x axis and the y axis is set as the z axis, at least two of the plurality of reflective units 21 to 29 form a first reflective unit group 20A disposed inside the optical means 30 so that the centers thereof are located on one straight line (which is referred to as a "first straight line") when the optical means 30 is viewed from the outside toward a plane perpendicular to the z axis.

Furthermore, at least two of the remaining reflective units 21 to 25, excluding the reflective units 26 to 29 forming the first reflective unit group 20A, form a second reflective unit group 20B disposed inside the optical means 30 so that the centers thereof are located on another straight line (which is referred to as a "second straight line") that is not parallel to the first straight line when the optical means 30 is viewed from the outside toward a plane perpendicular to the z axis.

In this case, the reflective units 26 to 29 constituting the first reflective unit group 20A are disposed closer to the second surface 32 of the optical means 30 as the distance from the image output unit 10 increases.

Furthermore, the reflective units 21 to 25 constituting the second reflective unit group 20B may be disposed to have the same distance to the second surface 32 of the optical means 30 regardless of the distance from the image output unit 10, and may be disposed closer to the second surface 32 of the optical means 30 as the distance from the image output unit 10 decreases.

In this case, the first and second straight lines may be included in any one plane perpendicular to the z axis. This implies that the plurality of reflective units forming the first and second reflective unit groups 20A and 20B are disposed inside the optical means 30 to be included in any one plane perpendicular to the z axis.

In other words, referring to the embodiment of FIGS. 7 and 8, when the optical means 30 is placed in front of the pupil 50 and the optical means 30 is viewed from the outside toward a plane perpendicular to the z axis as shown in FIG. 7 (when the optical means 30 is viewed in the direction of the paper in FIG. 7), a line connecting the centers of the reflective units 26 to 29 constituting the reflective unit group 20A forms the first straight line, a line connecting the centers of the reflective units 21 to 25 constituting the reflective unit group 20B also forms the second straight line, and the first and second straight lines are arranged not to be parallel to each other.

Figure 9:
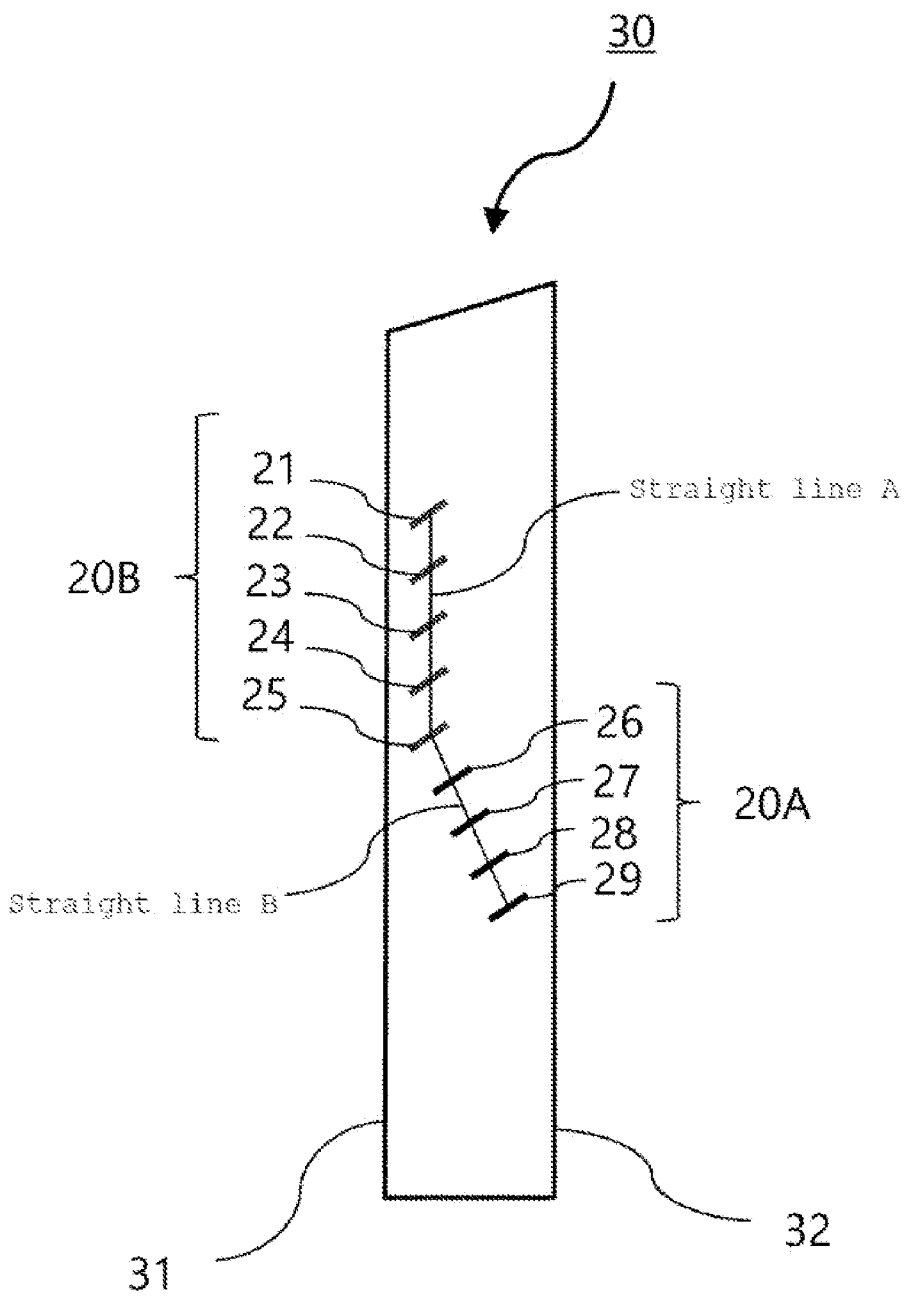
FIG. 9 is a diagram illustrating a structure in which the reflective units (21 to 29) illustrated in FIG. 7 are arranged.

FIG. 9 is a diagram illustrating a structure in which the reflective units 21 to 29 illustrated in FIG. 7 are arranged.

Referring to FIG. 9, as described above, the reflective means 20 includes a set of two reflective unit groups, i.e., the first reflective unit group 20A and the second reflective unit group 20B, the first reflective unit group 20A includes the plurality of reflective units 26 to 29, and the second reflective unit group 20B includes the plurality of reflective units 21 to 25.

As shown in FIG. 9, it can be seen that a straight line A (a first straight line) is formed when the centers of the reflective units 26 to 29 constituting the first reflective unit group 20A are connected with an imaginary line, a straight line B (a second straight line) is formed when the centers of the reflective units 21 to 25 constituting the second reflective unit group 20B are connected with an imaginary line, and the reflective units 21 to 29 are disposed in the space between the first and second surfaces 31 and 32 inside the optical means 30 so that the straight lines A and B are not parallel to each other.

In this case, it can be seen that the reflective units 26 to 29 constituting the first reflective unit group 20A are arranged closer to the second surface 32 of the optical means 30 as the distance from the image output unit 10 increases and the reflective units 21 to 25 constituting the second reflective unit group 20B are arranged to have the same distance from the second surface 32 of the optical means 30 regardless of the distance from the image output unit 10.

Although a case where the reflective means 20 is composed of the two reflective unit groups 20A and 20B has been shown in FIGS. 7 to 9, this is illustrative. It is obvious that the reflective means 20 may be composed of three or more reflective unit groups and three or more straight lines connecting the centers of the reflective units 21 to 29 may be formed.

Figure 10:
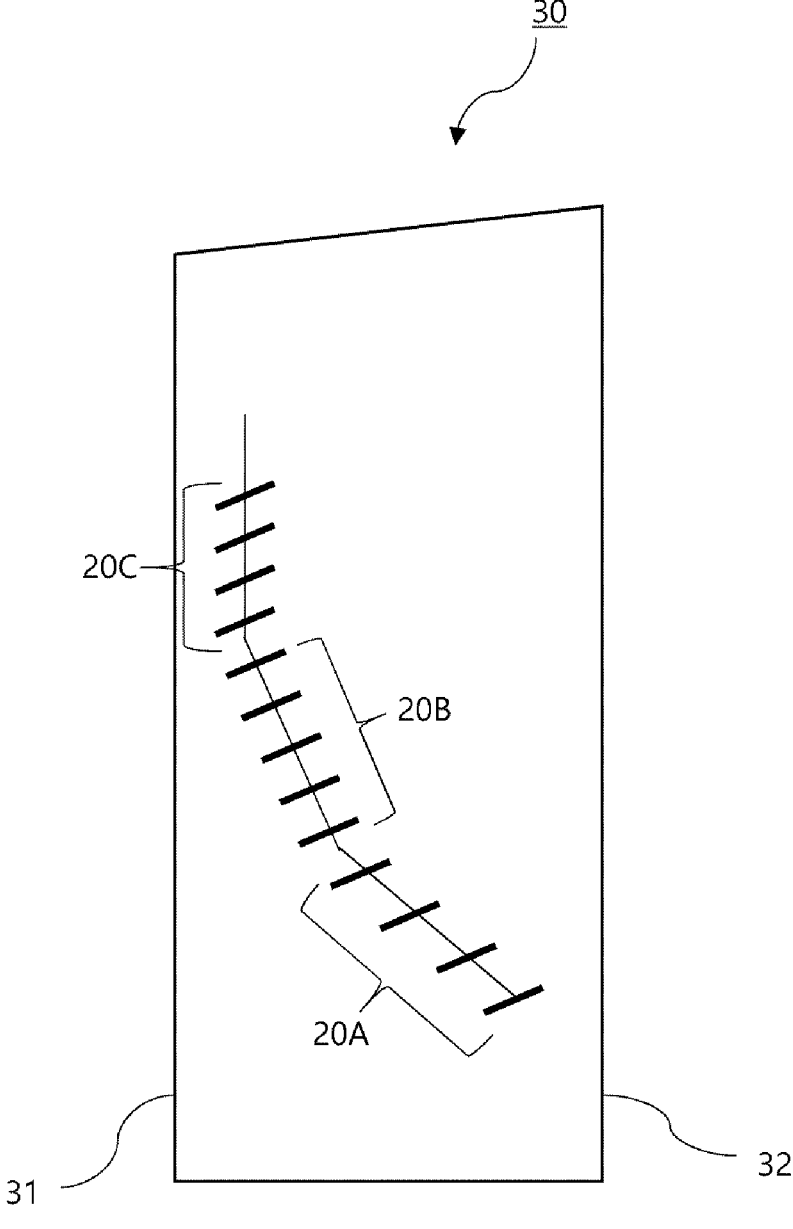
FIGS. 10 and 11 show other arrangement structures of a reflective means (20)
Figure 11:
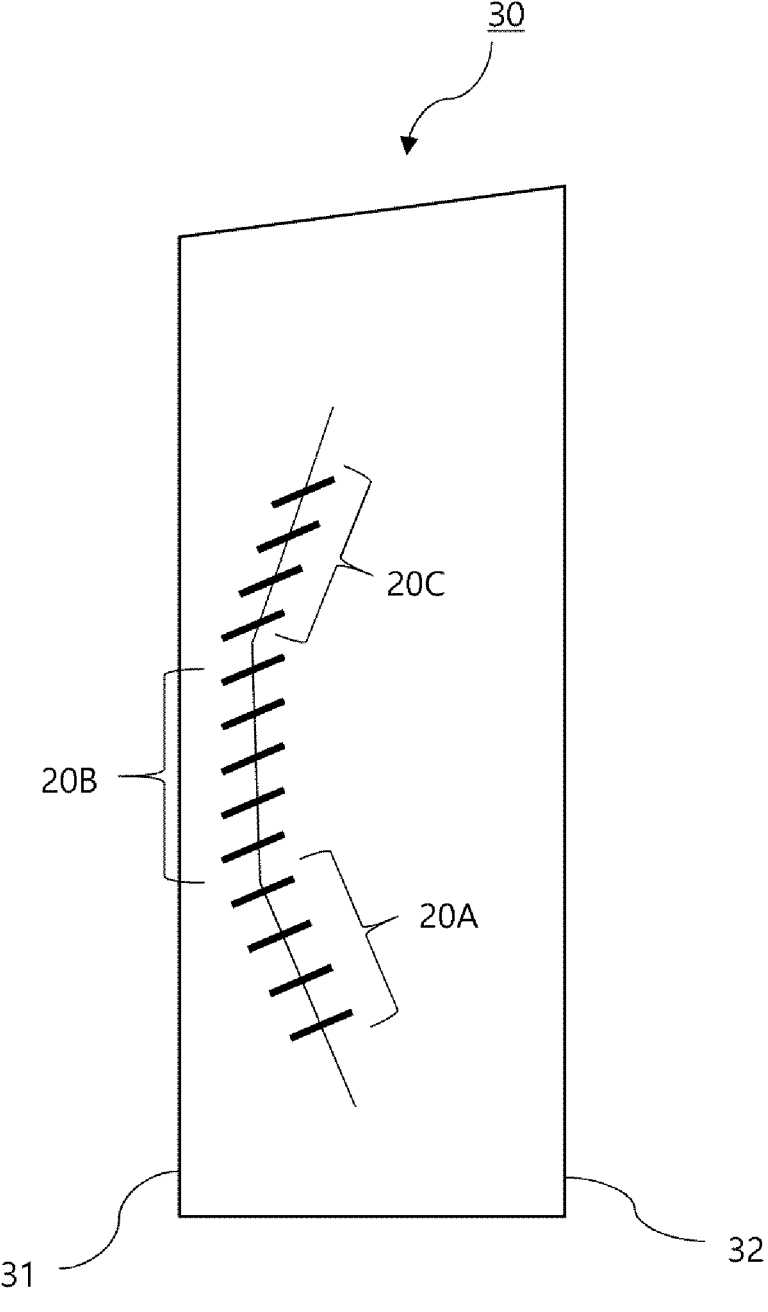

FIGS. 10 and 11 show other arrangement structures of the reflective means 20.

Referring to FIG. 10, it can be seen that the reflective means 20 is composed of a set of three reflective unit groups 20A, 20B, and 20C and the reflective units constituting the reflective unit groups 20A, 20B, and 20C are arranged such that lines connecting the centers of the respective reflective units form three straight lines when viewed from a side of the optical means 30.

In this case, the reflective units constituting the reflective unit group 20C are arranged to have the same distance to the second surface 32 of the optical means 30 regardless of the distance from the image output unit 10 and the reflective units constituting the reflective unit group 20B are arranged closer to the second surface 32 of the optical means 30 as the distance from the image output unit 10 increases, like the reflective units constituting the reflective unit group 20A.

This case may be considered to be a case where there are a plurality of reflective groups 20A each composed of reflective units that are arranged closer to the second surface 32 of the optical means 30 as the distance from the image output unit 10 increases. However, even in this case, the straight lines constituting the respective reflective unit groups 20A and 20B are arranged not to be parallel to each other.

Even in FIG. 11, it can be seen that the reflective means 20 is composed of a set of three reflective unit groups 20A, 20B, and 20C and all the reflective units constituting the individual reflective unit groups 20A, 20B, and 20C are arranged such that lines connecting the centers of the reflective units form three straight lines when viewed from a side of the optical means 30.

In FIG. 11, the reflective units constituting the reflective unit group 20A are disposed closer to the second surface 32 of the optical means 30 as the distance from the image output unit 10 increases, and the reflective units constituting the reflective unit group 20B are arranged to have the same distance from the second surface 32 of the optical means 30 regardless of the distance from the image output unit 10.

In addition, it can be seen that the reflective units constituting the reflective unit group 20C are disposed closer to the second surface 32 of the optical means 30 as the distance from the image output unit 10 decreases.

Meanwhile, in the above embodiments, it is preferable that the reflective units be disposed such that the straight lines connecting the centers of the reflective units of the individual reflective unit groups 20A, 20B, and 20C are connected to each other, but the straight lines do not necessarily need to be connected to each other.

Figures 12A, 12B, 12C:
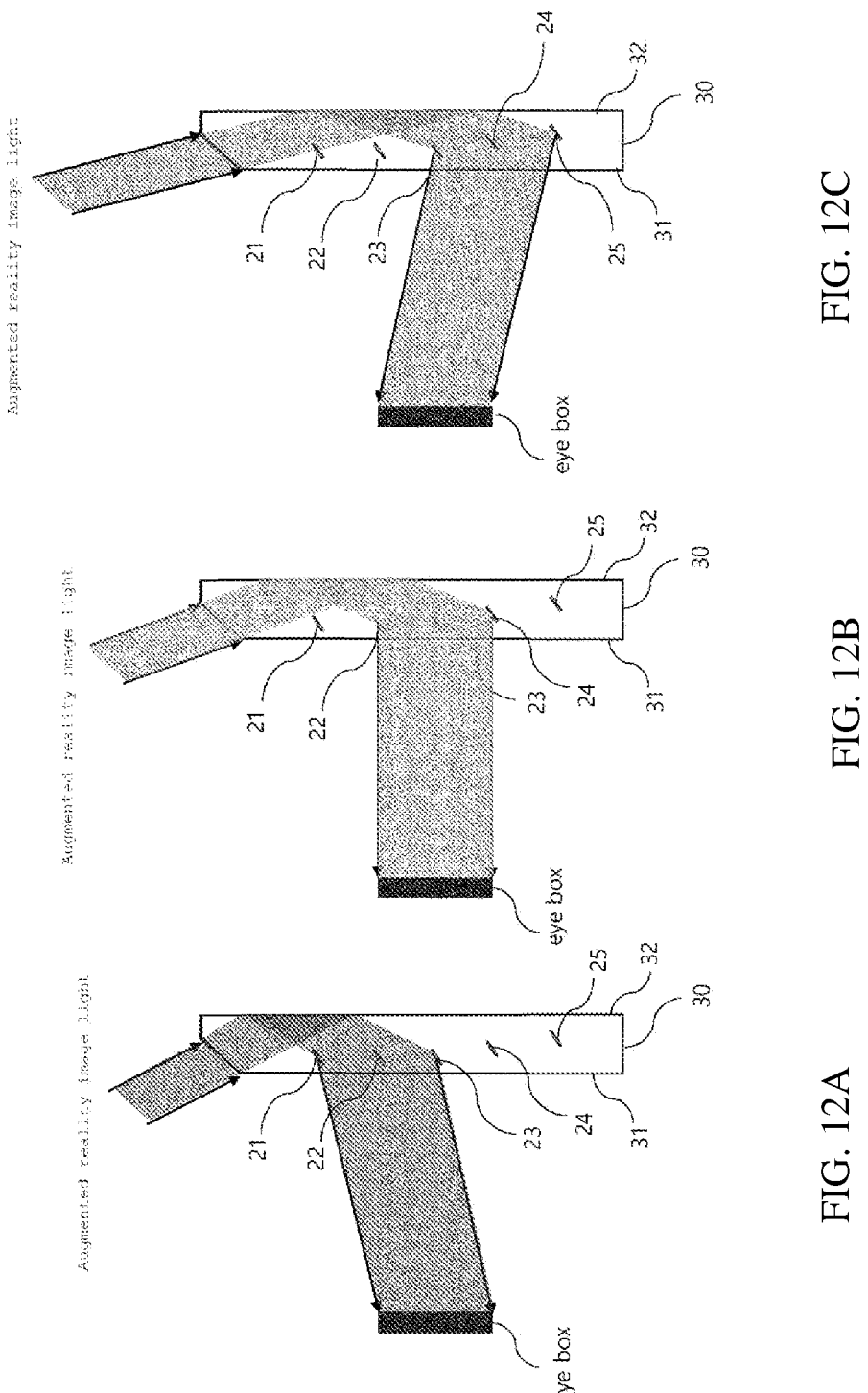
FIGS. 12A, 12B, 12C and 13 are views illustrating the overall operation of the optical device (300) for augmented reality.
Figure 13:
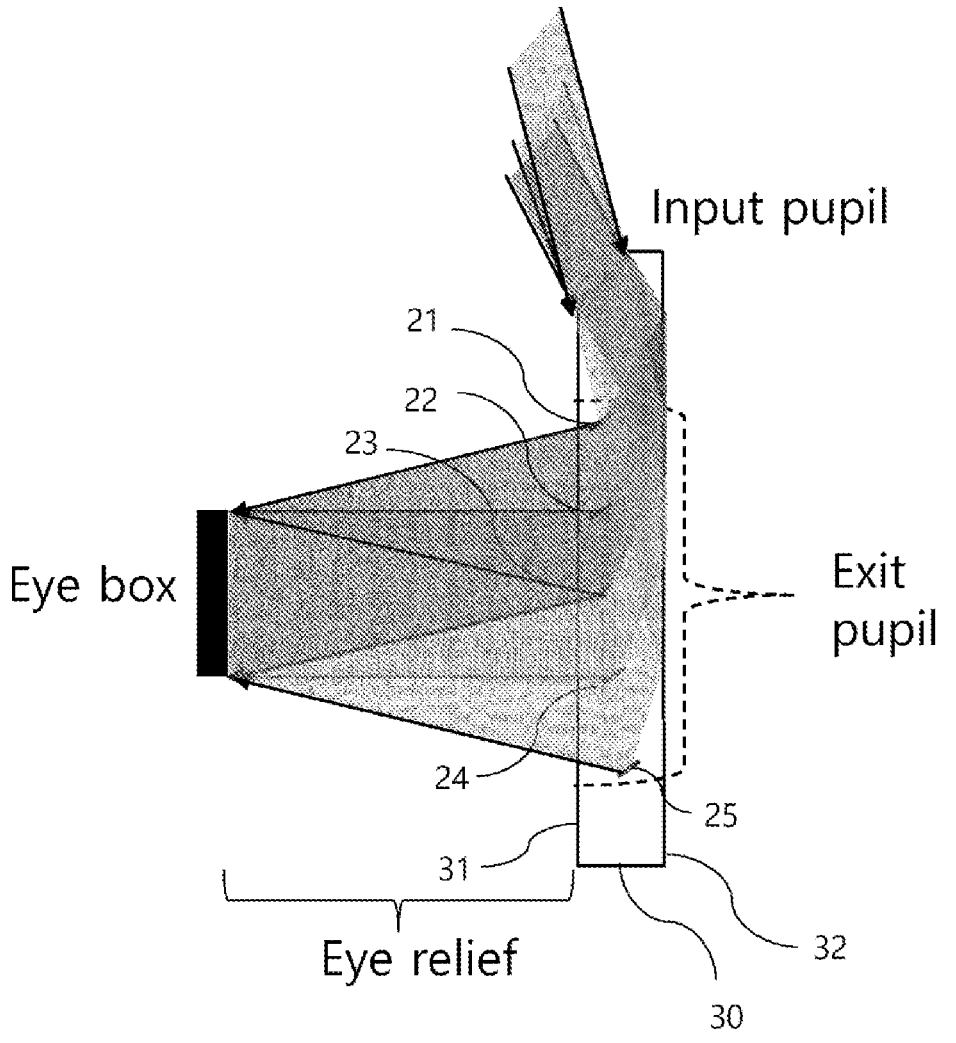

FIGS. 12 and 13 are views illustrating the overall operation of the optical device 300 for augmented reality.

FIGS. 12 and 13 illustrate cases where total internal reflection is performed once inside the optical means 30, in which only five reflective units 21 to 25 are shown for convenience of description.

Referring to FIGS. 12(*a*), 12(*b*) and 12(*c*), it can be seen that augmented reality image light having different angles is reflected by total internal reflection on the second surface 32 of the optical means 30 and is then transferred to an eye box by the reflective units 21 to 25 having the inclination angles and arrangement structures described above.

The reflective units 21 to 23 are used in FIG. 12A, the reflective units 22 to 24 are used in FIG. 12B, and the reflective units 23 to 25 are used in FIG. 12C. These transfer the augmented reality image light to the eye box in accordance with the incidence angle of the optical path of the augmented reality image light, i.e., the output angle of the optical path of the augmented reality image light output from the image output unit 10.

In this case, the eye box may be considered to be the maximum space in which a user's pupil 50 can be located when viewing the augmented reality image light as it is output from the image output unit 10. The second surface 32 of the optical means 30 serves as an input surface, and the augmented reality image light reflected by total internal reflection on the second surface 32 of the optical means 30 is output toward the eye box through the reflective units 21 to 25.

Meanwhile, FIG. 13 shows the pieces of augmented reality image light, shown in FIGS. 12(*a*), 12(*b*), and 12(*c*), together. It can be seen that the augmented reality image light output from the image output unit 10 is incident through the upper portion of the optical means 30 serving as an input pupil, is reflected by total internal reflection on the second surface 32 of the optical means 30, is reflected by the reflective units 21 to 25, and is transferred to the eye box through the first surface 31 of the optical means 30 acting as an exit pupil. In this case, the distance between the eye box where the pupil 50 can be located and the optical means 30 becomes an eye relief.

As shown in FIGS. 12 and 13, it can be seen that the augmented reality image light output from the image output unit 10 and reflected by total internal reflection on the second surface 32 of the optical means 30 is transferred toward the eye box through the inclination angle and arrangement structures of the reflective units 21 to 25 described above, thereby remarkably improving the optical efficiency of the augmented reality image light.

Figure 14:
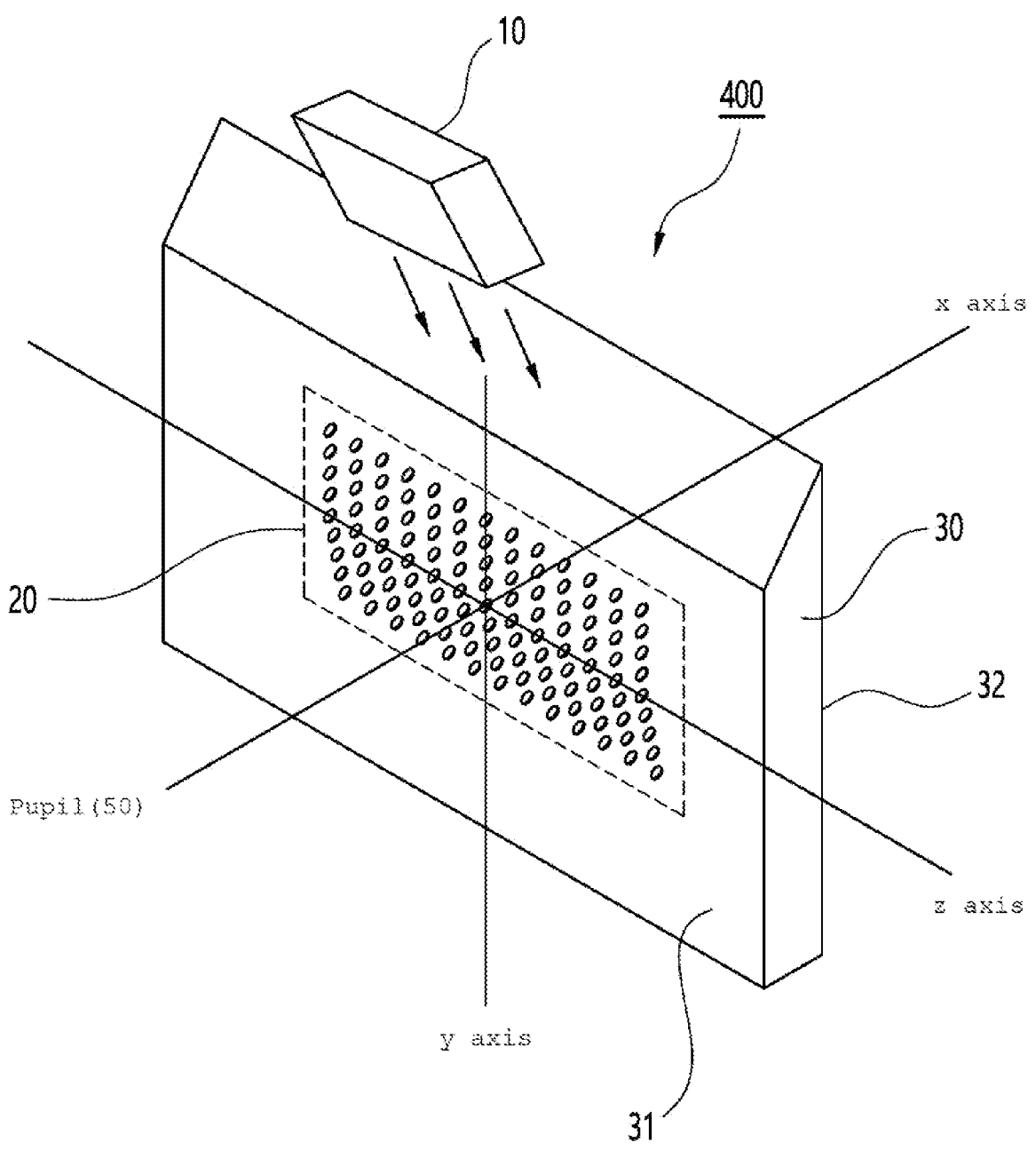
FIG. 14 is a perspective view when an optical device (400) for augmented reality according to another embodiment of the present invention is placed in front of the pupil (50)
Figure 15:
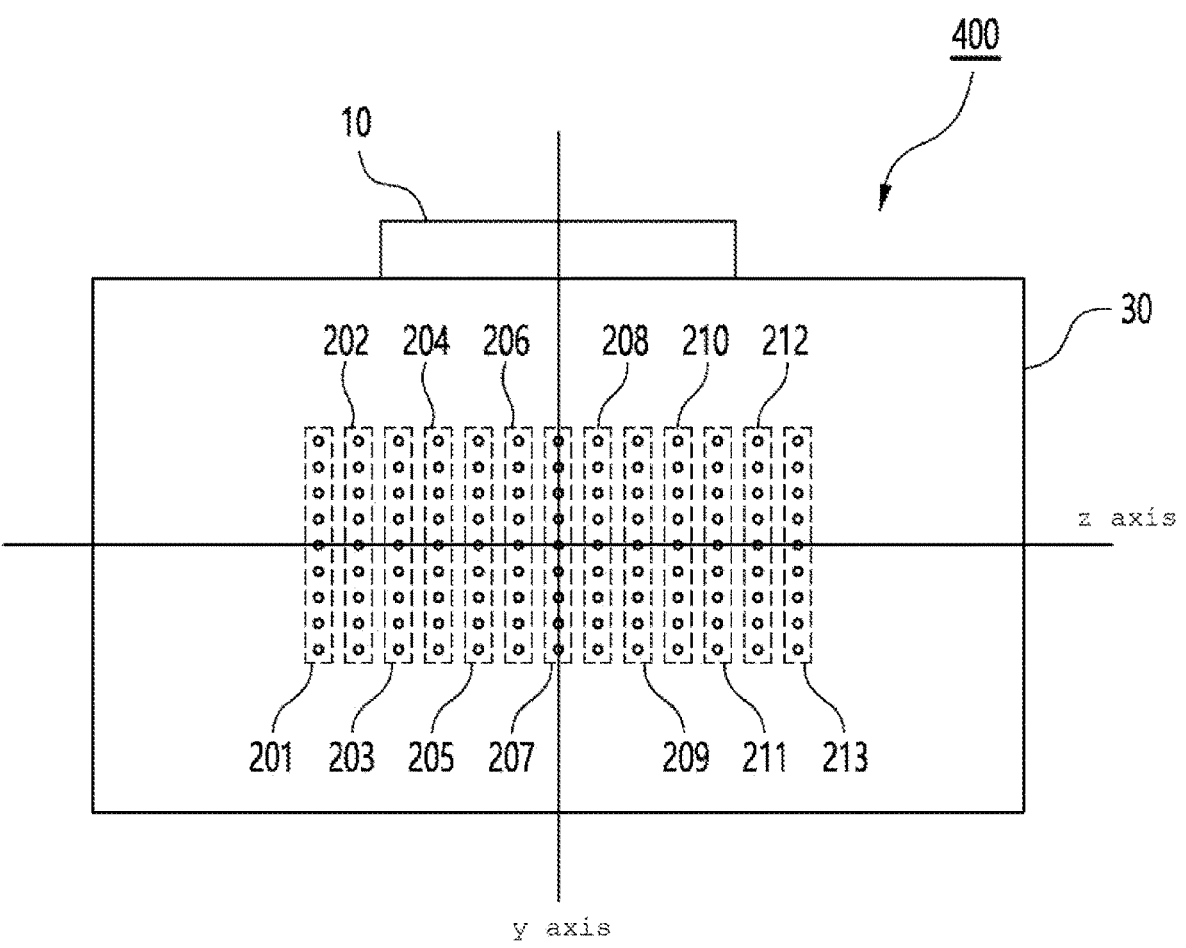
FIG. 15 is a front view viewed from the pupil (50) when the optical device (400) for augmented reality according to the embodiment of the present invention is placed in front of the pupil (50)

FIGS. 14 and 15 are diagrams showing the configuration of an optical device 400 for augmented reality according to another embodiment of the present invention, in which FIG. 14 is a perspective view when the optical device 400 for augmented reality is placed in front of the pupil 50 and FIG. 15 is a front view viewed from the pupil 50 when the optical device 400 for augmented reality is placed in front of the pupil 50.

The optical device 400 for augmented reality according to the embodiment of FIGS. 14 and 15 has the same basic configuration as the optical device 300 for augmented reality according to the above-described embodiment, but includes a plurality of reflective means 201 to 213 each composed of a plurality of reflective means 21 to 29.

In this case, the plurality of reflective units 201 to 213 have the following arrangement structure. In other words, as described above, when the optical means 30 is placed in front of the user's pupil 50, a forward direction from the pupil 50 is set as the x axis, any one of the line segments passing between the first and second surfaces 31 and 32 of the optical means 30 while being parallel to a vertical line extending from the image output unit 10 to the x axis along the x axis is set as the y axis, and a line segment orthogonal to the x axis and the y axis is the z axis, the reflective means 201 to 213 are spaced apart in parallel to each other along the z-axis direction.

Although the reflective means 201 to 213 are arranged in parallel at regular intervals along the z-axis direction in FIGS. 14 and 15, this is illustrative, and the reflective means 201 to 213 are not necessarily arranged at regular intervals.

In addition, the intervals between the reflective units 201 to 213 along the z-axis direction shown in FIGS. 14 and 15 are shown as an example for convenience of description, and the reflective units 201 to 213 may be arranged at shorter intervals in practice. For example, the intervals between the reflective units 201 to 213 may be shorter than or equal to the size of the reflective units 21 to 29.

Furthermore, the numbers of reflective units 21 to 29 constituting the reflective means 201 to 213 do not need to be the same.

Furthermore, the reflective means 201 to 213 are arranged such that each of the reflective units 21 to 29 constituting each of the reflective means 201 to 213 may be disposed to be located together with any one of the reflective units 21 to 29 constituting an adjacent one of the reflective means 201 to 213 along one imaginary straight line parallel to the z axis. In this case, when the plurality of reflective means 201 to 213 are viewed from the outside toward a plane perpendicular to the z axis, they appear the same as shown in FIG. 7.

According to the embodiment of FIGS. 14 and 15, there is the advantage of increasing the viewing angle and the eye box in the z-axis direction while having the same effect as described above.

Figure 16:
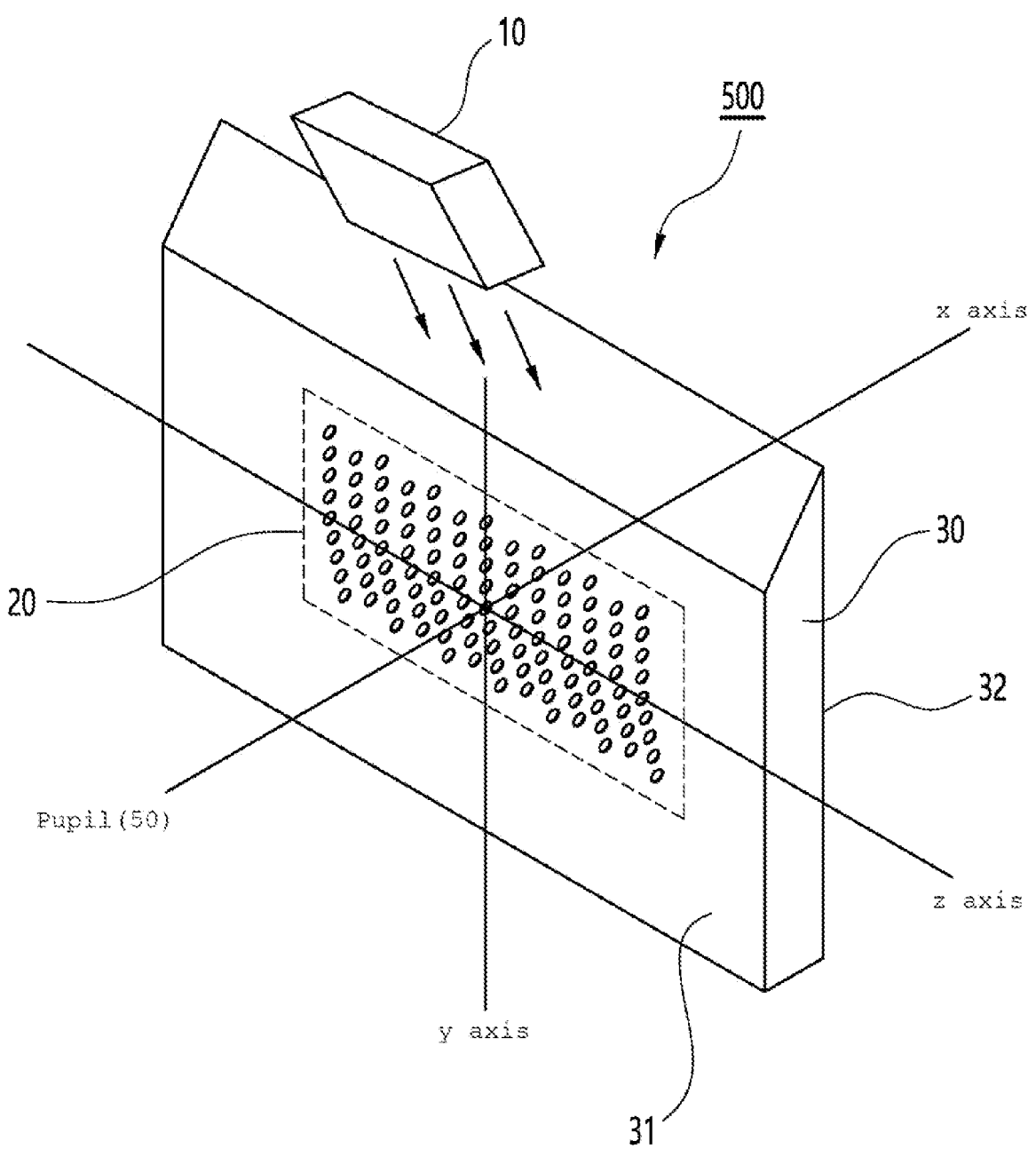
FIG. 16 is a perspective view when an optical device (500) for augmented reality according to still another embodiment of the present invention is placed in front of the pupil (50)
Figure 17:
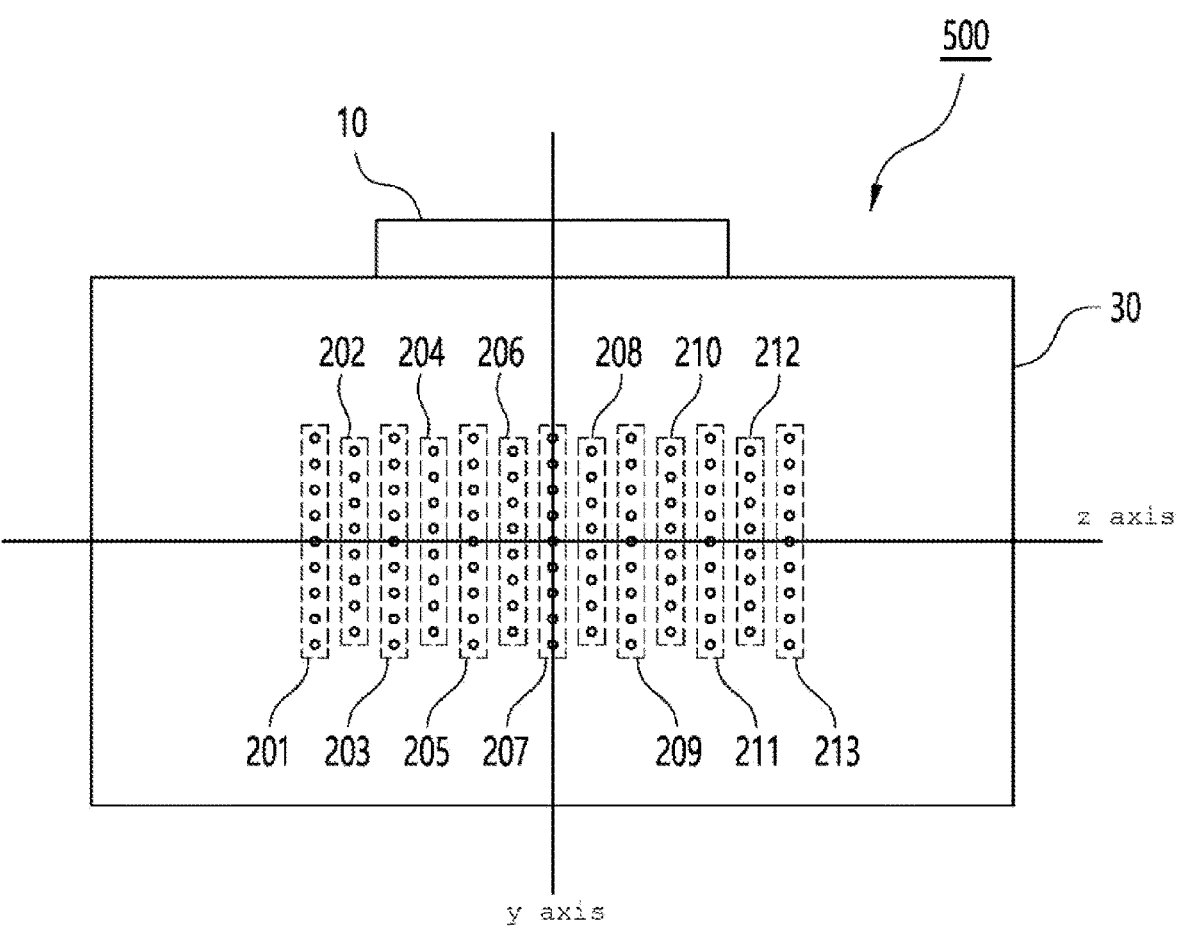
FIG. 17 is a front view viewed from the pupil (50) when the optical device (500) for augmented reality according to the embodiment of the present invention is placed in front of the pupil (50)

FIGS. 16 and 17 show an optical device 500 for augmented reality according to another embodiment of the present invention, in which FIG. 16 is a perspective view when the optical device 500 for augmented reality is placed in front of the pupil 50 and FIG. 17 is a front view viewed from the pupil 50 when the optical device 500 for augmented reality is placed in front of the pupil 50.

The embodiment of FIGS. 16 and 17 is basically the same as the embodiment of FIGS. 14 and 15, but is different in that each of reflective means 201 to 28 or 21 to 29 constituting each of reflective means 201 to 213 is arranged not to be located together with all reflective units 21 to 28 or 21 to 29 constituting an adjacent one of the reflective means 201 to 213 along an imaginary straight line parallel to the z axis.

In other words, as shown in FIG. 17, when the reflective units 21 to 29 of the first reflective means 201 and the reflective units 21 to 28 of the second reflective means 202, which are adjacent to each other from the left side of the z axis, are compared with each other sequentially from the upper side of the y axis (the image output unit (10) side), each of the reflective units 21 to of the first reflective means 201 is arranged not to be located together with all the reflective units 21 to 28 of the second reflective means 202 along an imaginary straight line parallel to the z axis.

In other words, it can be seen that the reflective units 21 to 29 of the first reflective means 201 and the reflective units 21 to 28 of the second reflective means 202 are not aligned to be parallel to the z-axis but are staggered from each other.

Although the reflective means 201 to 213 are arranged in parallel at regular intervals along the z-axis direction in FIGS. 16 and 17, this is illustrative, and the reflective means 201 to 213 are not necessarily arranged to have regular intervals.

Furthermore, the intervals between the reflective units 201 to 213 along the z-axis direction shown in FIGS. 16 and 17 are shown as an example for convenience of description, and the reflective units 201 to 213 may be arranged at shorter intervals in practice. For example, the intervals between the reflective units 201 to 213 may be shorter than or equal to the size of the reflective units 21 to 29.

Figure 18:
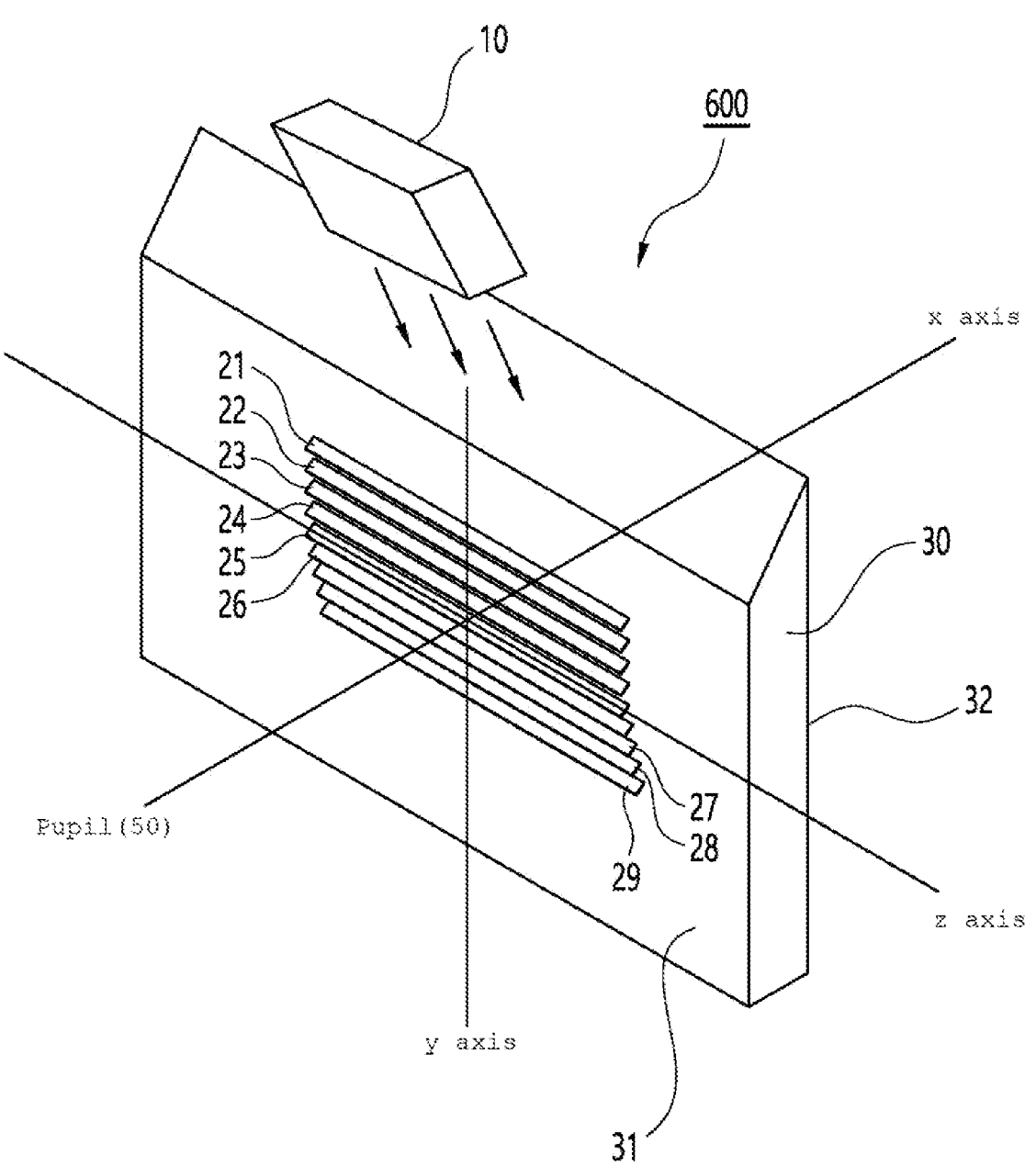
FIG. 18 is a perspective view when an optical device (600) for augmented reality according to still another embodiment of the present invention is placed in front of the pupil (50)
Figure 19:
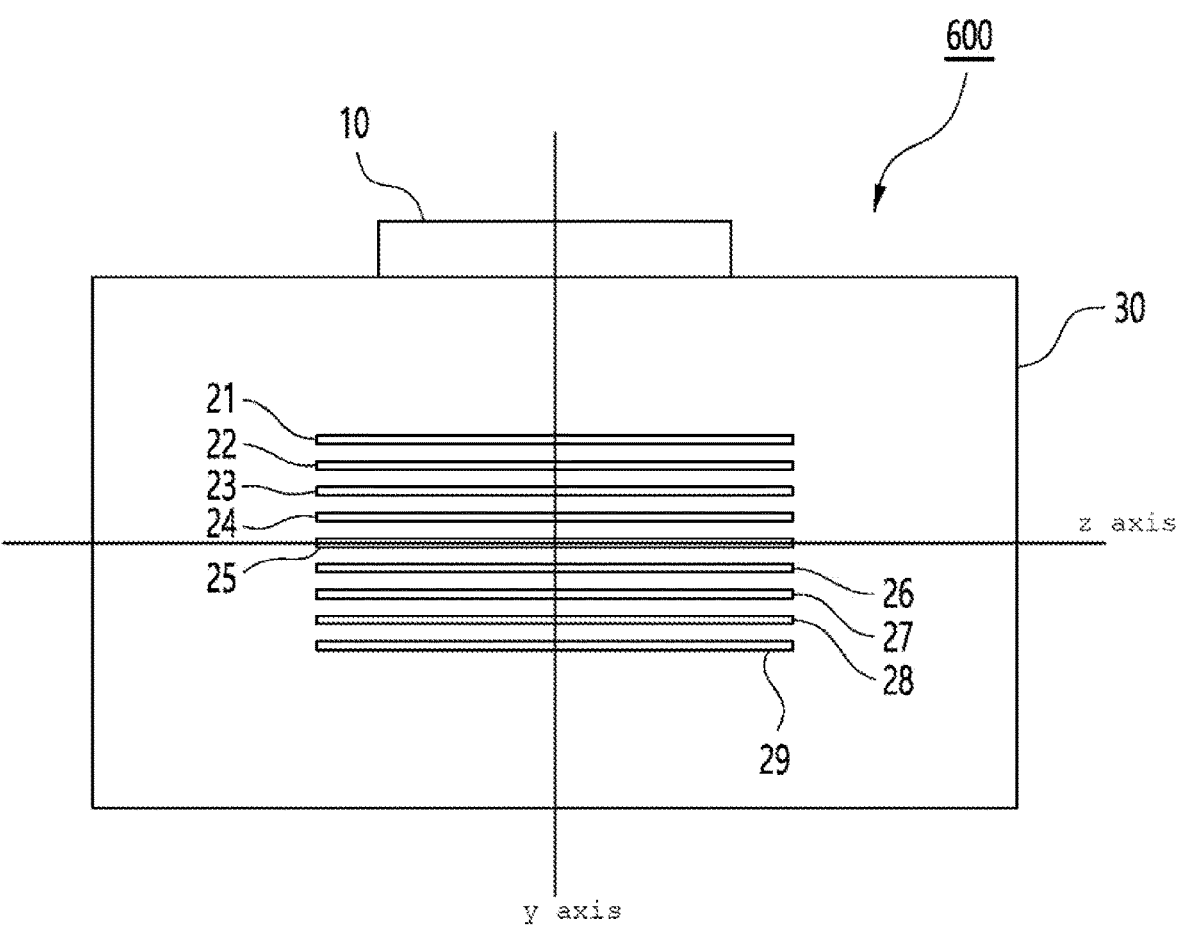
FIG. 19 is a front view viewed from the pupil (50) when the optical device (600) for augmented reality according to the embodiment of the present invention is placed in front of the pupil (50)

FIGS. 18 and 19 are diagrams showing the configuration of an optical device 600 for augmented reality according to still another embodiment of the present invention, in which FIG. 18 is a perspective view when the optical device 600 for augmented reality is placed in front of the pupil 50 and FIG. 19 is a front view viewed from the pupil 50 when the optical device 600 for augmented reality is placed in front of the pupil 50.

The optical device 600 for augmented reality of the embodiment of FIGS. 18 and 19 is basically the same as the optical device 300 for augmented reality of the embodiment described with reference to FIGS. 7 to 13, but is characterized in that each of the reflective units 21 to 29 extends in a bar shape along the z-axis direction.

In this case, the individual reflective units 21 to 29 have the following arrangement structure. In other words, as described above, when the optical means 30 is placed in front of a user's pupil 50, a forward direction from the pupil 50 is set as the x axis, any one of the line segments passing between the first and second surfaces 31 and 32 of the optical means 30 while being parallel to a vertical line extending from the image output unit 10 to the x axis along the x axis is set as the y axis, and a line segment orthogonal to the x axis and the y axis is the z axis, the plurality of reflective units 21 to 29 are formed in bar shapes extending along imaginary straight lines parallel to the z axis.

Even in the case of the present embodiment, when the optical means 30 is viewed from the outside toward a plane perpendicular to the z axis, the shapes of the respective reflective units 21 to 29 appear the same as shown in FIG. 7.

In this case, it is preferable that the plurality of reflective units 21 to 29 be formed to extend longer than the length of the image output unit 10 in the z-axis direction when the optical device 600 for augmented reality is viewed from the pupil 50, i.e., when the optical device 600 for augmented reality is viewed in the x-axis direction.

In addition, in the case of the present embodiment, it is preferable that the size of the reflective units 21 to 29 when viewed in the x-axis direction, i.e., when viewed from the pupil 50, is formed to be 4 mm or less. In this case, the size of the reflective units 21 to 29 refers to the size thereof in the y-axis direction.

Figure 20:
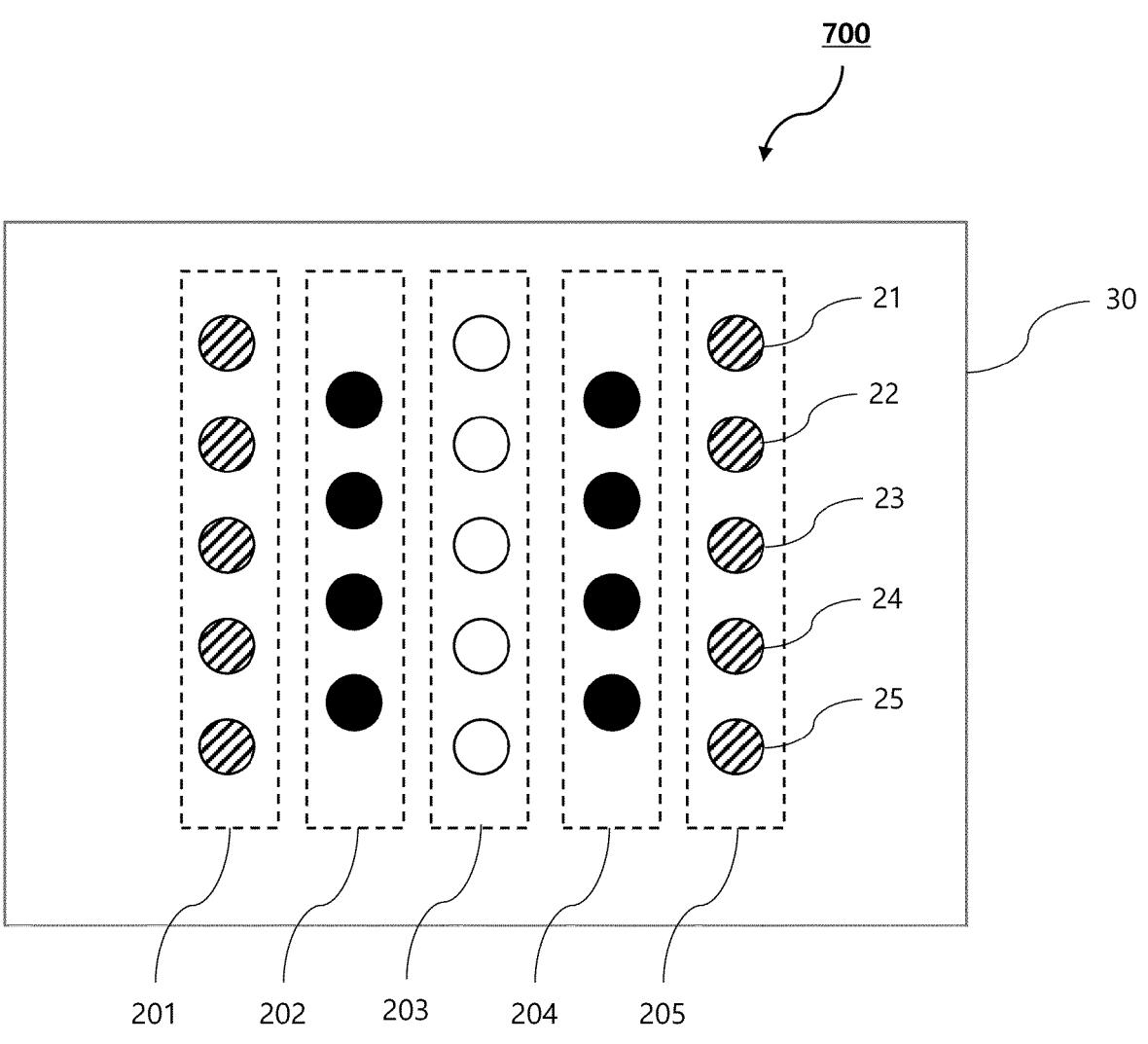
FIG. 20 is a front view of an optical device (700) for augmented reality according to still another embodiment of the present invention that is viewed from the pupil (50) side.
Figure 21:
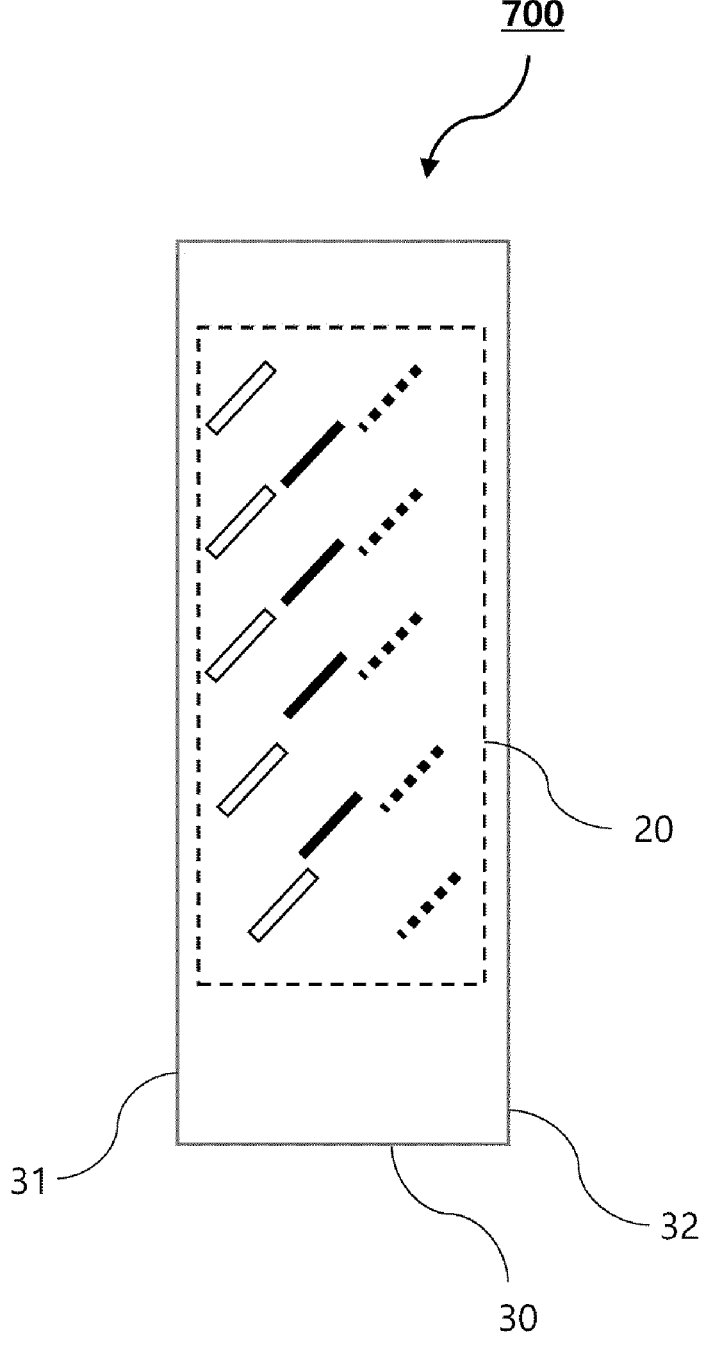
FIG. 21 is a side view of the optical device (700) for augmented reality according to the embodiment of the present invention that is viewed in the z-axis direction as described above.

FIGS. 20 to 22 are diagrams illustrating an optical device 700 for augmented reality according to still another embodiment of the present invention, in which FIG. 20 is a front view of the optical device 700 for augmented reality that is viewed from the pupil (50) side, FIG. 21 is a side view of the optical device 700 for augmented reality that is viewed in the z-axis direction as described above, and FIG. 22 is a plan view of the optical device 700 for augmented reality that is viewed in the y-axis direction as described above.

Figure 22:
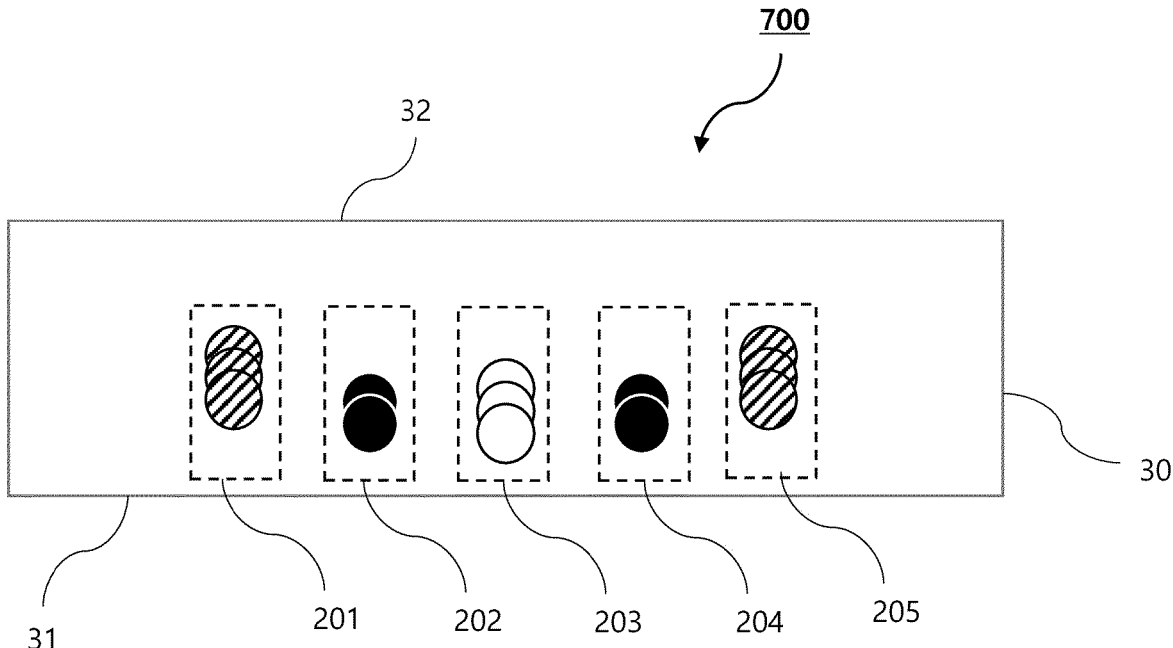
FIG. 22 is a plan view of the optical device (700) for augmented reality according to the embodiment of the present invention that is viewed in the y-axis direction as described above.

The optical device 700 for augmented reality shown in FIGS. 20 to 22 is composed of a plurality of reflective means 201 to 205 as in the optical device 400 for augmented reality of FIGS. 14 and 15, but is different in that there are one or more reflective means 201 to 205 disposed inside the optical means 30 so that the distances between the reflective means 201 to 205 and the first surface 31 of the optical means 30 are not all the same.

In other words, as described above, when the optical device 700 for augmented reality is placed in front of the user's pupil 50, a forward direction from the pupil 50 is set as the x axis, any one of the line segments passing between the first and second surfaces 31 and 32 of the optical means 30 while being parallel to a vertical line extending from the image output unit 10 to the x axis along the x axis is set as the y axis, and a line segment orthogonal to the x axis and the y axis is set as the z axis, the reflective means 201 to 205 are arranged such that there are one or more reflective means 201 to 205 arranged such that the distances between the individual reflective means 201 to 205 and the first surface 31 of the optical means 30 are not all the same.

In other words, as shown in FIG. 21, at least some of the plurality of reflective units 201 to 205 are arranged not to overlap each other when the optical means 30 is viewed from the outside toward a plane perpendicular to the z axis.

In the embodiment of FIGS. 20 to 22, the arrangement is made such that the distance between the two reflective means 201 and 205 indicated by oblique lines and the first surface 31 of the optical means 30, the distance between the two reflective means 202 and 204 indicated in black and the first surface 31 of the optical means 30, and the distance between one reflective means 203 indicated in white and the first surface 31 of the optical means 30 are different from each other.

In this case, although the distances between the two reflective means 201 and 205 indicated by oblique lines and the first surface 31 of the optical means 30 are shown to be the same and the distances between the two reflective means 202 and 204 indicated in black and the first surface 31 of the optical means 30 are shown to be the same, this is illustrative. It is obvious that the arrangement may be made such that all the distances between the reflective means 201 to 205 and the first surface 31 of the optical means 30 are different from each other.

Meanwhile, in the above-described embodiments, the size of at least some of the reflective units 21 to 29 may be configured to be different from that of the other reflective units 21 to 29. Even in this case, it is preferable that the reflective units 21 to 29 be formed to have a size of 4 mm or less as described above.

Alternatively, although it is preferable that the respective reflective units 21 to 29 be arranged at the same intervals, the respective reflective units 21 to 29 may be arranged such that the intervals between at least some of the reflective units 21 to 29 may be different from the intervals between the other reflective units 21 to 29.

Furthermore, the inclination angle of at least some of the reflective units 21 to 29 with respect to the x axis may be configured to be different from that of the other reflective units 21 to 29.

Furthermore, at least some of the reflective units 21 to 29 may each be formed of a means such as a half mirror that partially reflects light.

Furthermore, at least some of the reflective units 21 to 29 may each be formed of a refractive element other than a reflective means.

Furthermore, at least some of the reflective units 21 to 29 may each be formed of an optical element such as a notch filter that selectively transmits light therethrough depending on the wavelength thereof.

Furthermore, at least some of the reflective units 21 to 29 may each be coated with a material absorbing light without reflecting light on the surface of the reflective unit opposite to the surface of the reflective unit that reflects augmented reality image light.

Furthermore, the surfaces of at least some of the reflective units 21 to 29 may each be formed as a curved surface. In this case, the curved surface may be a concave surface or a convex surface.

Furthermore, at least some of the reflective units 21 to 29 may each be formed of an optical element such as a diffractive optical element (DOE) or a holographic optical element (HOE).

Next, a method for manufacturing the optical means 30 of the optical devices 300 to 700 for augmented reality described in the above-described embodiments will be described with reference to FIGS. 23 to 27.

Figure 23:
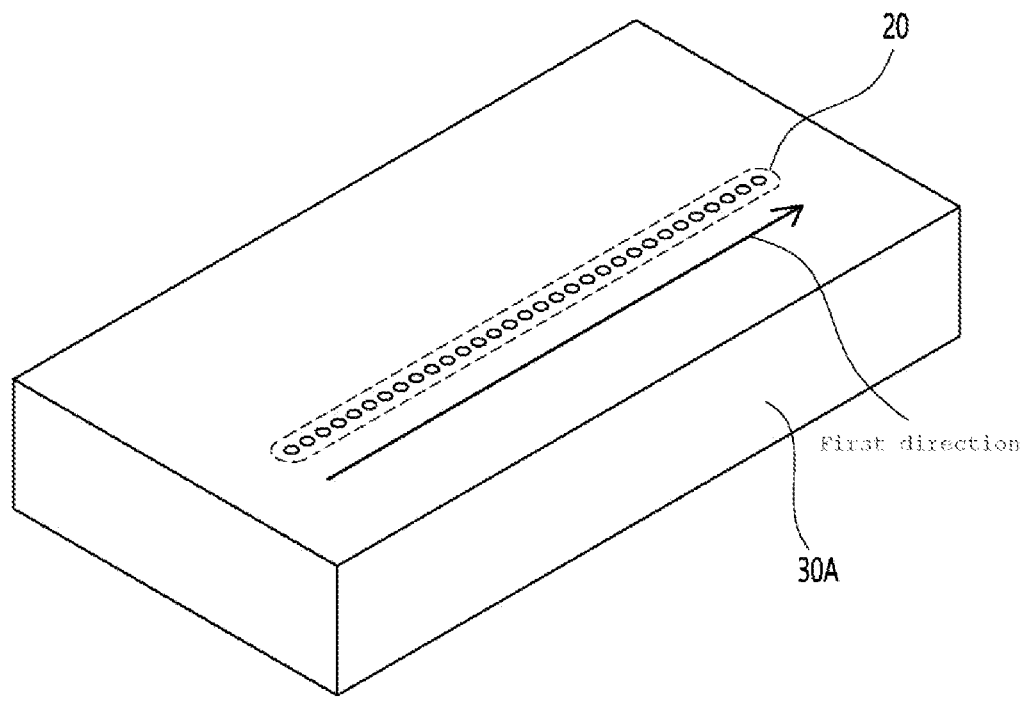
FIG. 23 is a perspective view of a base substrate (30A)
Figure 24:
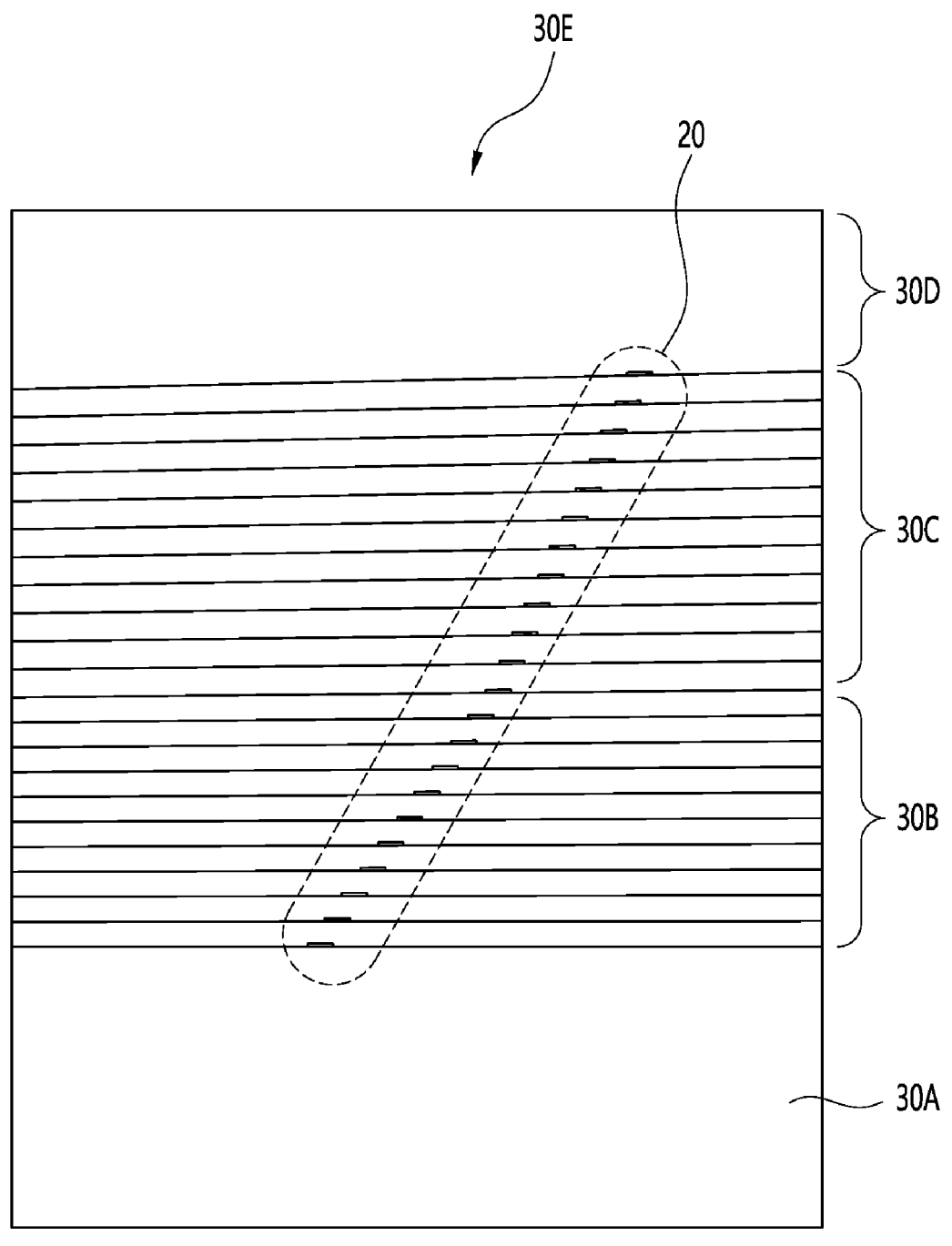
FIGS. 24 and 25 are side and perspective views of an optical means base material (30E), respectively.
Figure 25:
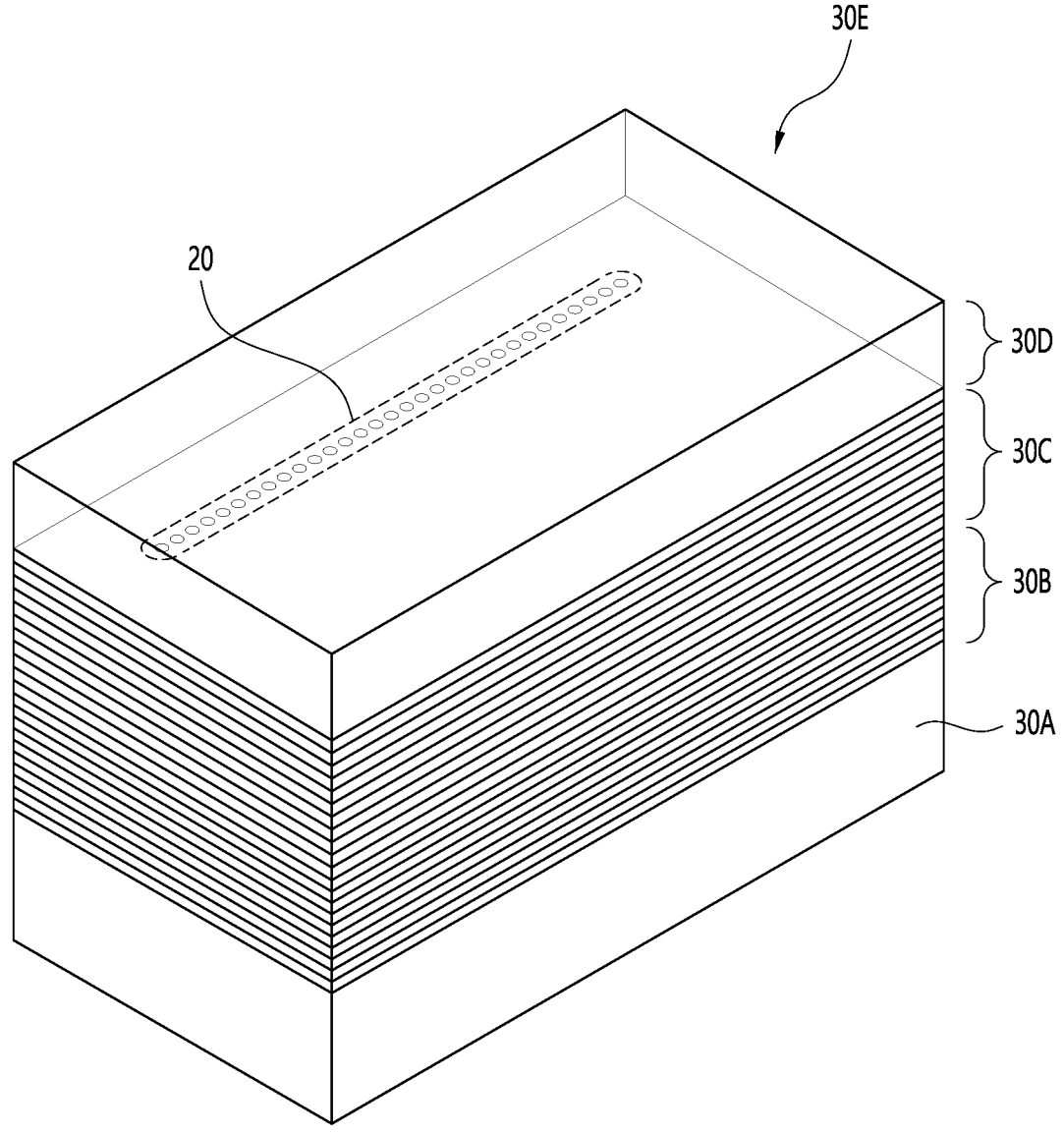
Figure 26A:
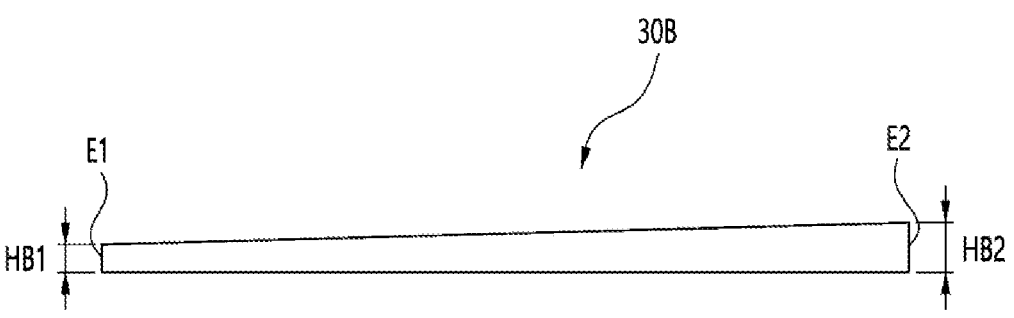
FIG. 26A and FIG. 26B show side views of a first substrate (30B) and a second substrate (30C)
Figure 26B:
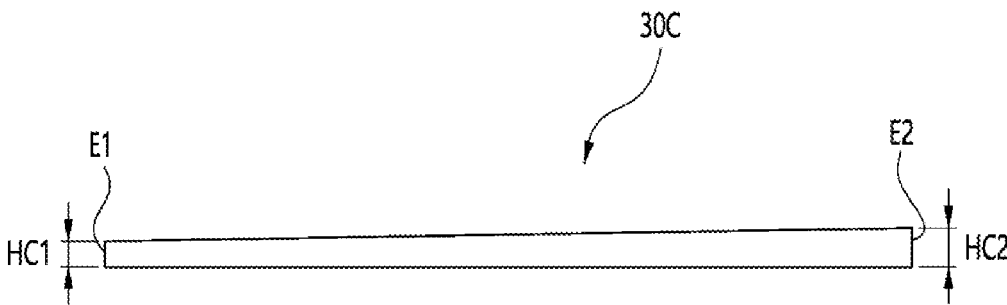
Figure 27:
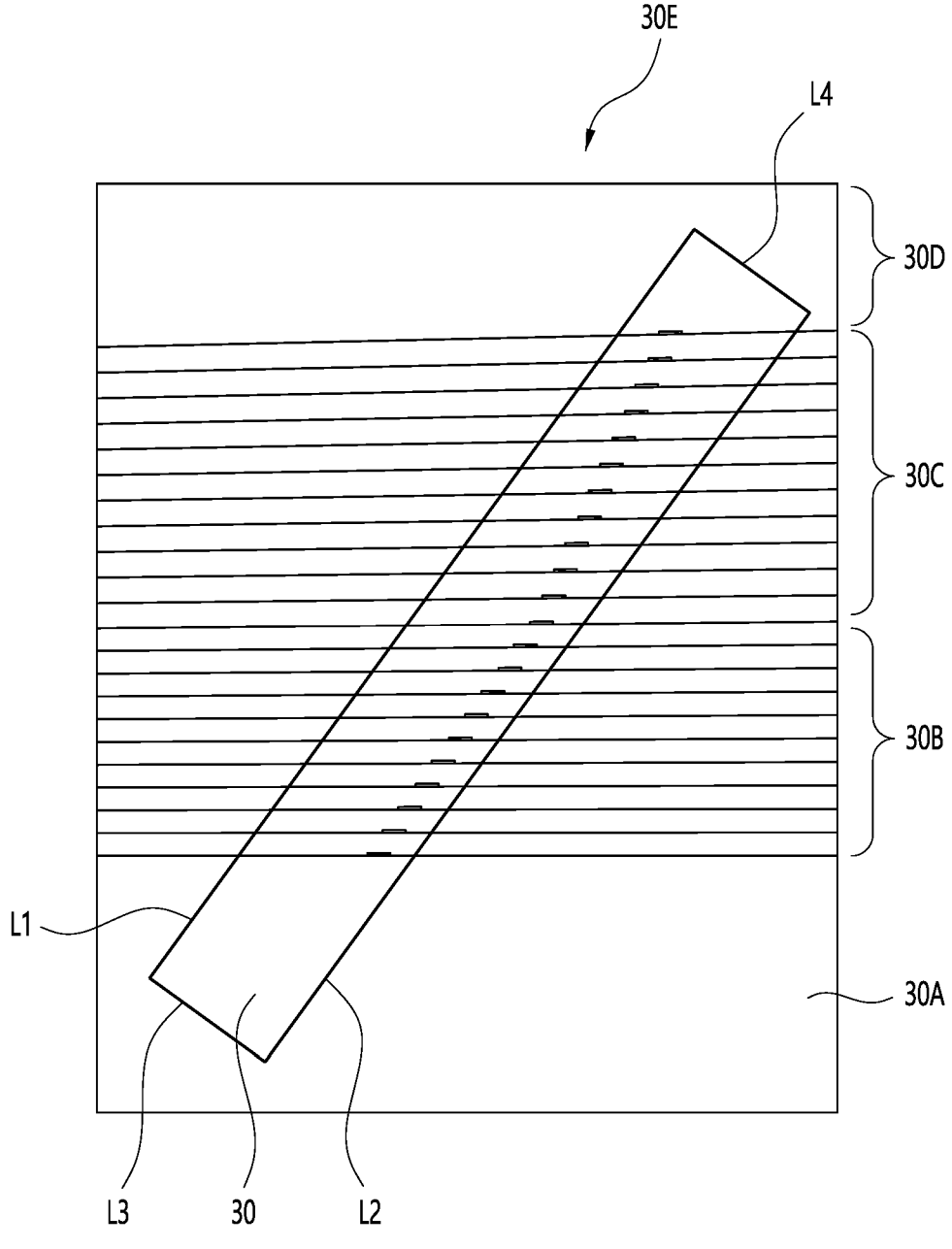
FIG. 27 is a diagram illustrating a method of forming the optical means (30) by cutting the optical means base material (30E)

FIG. 23 is a perspective view of a lower base substrate 30A, FIG. 24 is a side view of an optical means base material 30E, FIG. 25 is a perspective view of the optical means base material 30E, FIG. 26A and FIG. 26B show side views of a first substrate 30B and a second substrate 30C, and FIG. 27 is a diagram illustrating a method of forming the optical means 30 by cutting the optical means base material 30E.

The optical means 30 of the optical devices 300 to 700 for augmented reality described in the above-described embodiments are manufactured through the process of first forming the optical means base material 30E by stacking the lower base substrate 30A, first substrates 30B, second substrates 30C, and an upper base substrate 30D on top of one another and then cutting the optical means base material 30E.

To this end, first, as shown in FIG. 23, a plurality of reflective units 20 are formed on the surface of the lower base substrate 30A in a first direction.

In this case, although the lower base substrate 30A approximately has a rectangular parallelepiped shape, it is not limited thereto.

Thereafter, as shown in FIGS. 24 and 25, the plurality of first substrates 30B are sequentially bonded and stacked on the surface of the lower base substrate 30A, and a plurality of reflective units 20 are formed on a surface of each of the plurality of first substrates 30B along a direction parallel to the first direction.

In this case, the reflective units 20 formed on each of the plurality of first substrates 30B are formed on a surface of each of the plurality of first substrates 30B so that a line connecting the centers of reflective units 20 formed on the surfaces of the respective first substrates 30B forms a straight line when the first substrates 30B are viewed from the outside toward a plane perpendicular to the first direction (when the first substrates 30B are viewed in the direction of the paper in FIG. 24).

When the stacking of the plurality of first substrates 30B is completed through this process, the plurality of second substrates 30C are sequentially bonded and stacked on the uppermost one of the first substrates 30B in the same manner, and reflective units 20 are formed on a surface of each of the plurality of second substrates 30C along a direction parallel to the first direction, thereby forming the optical means base material 30E.

In this case, the reflective units 20 formed on each of the plurality of second substrates 30C are formed on a surface of each of the second substrates 30C so that a line connecting the centers of reflective units 20 formed on the surfaces of the respective second substrates 30C forms a straight line when the second substrates 30C are viewed from the outside toward a plane perpendicular to the first direction (when the second substrates 30C are viewed in the direction of the paper in FIG. 24).

In this case, the reflective units 20 are arranged such that a straight line connecting the centers of the reflective units 20 formed on the first substrates 30B and a straight line connecting the centers of the reflective units 20 formed on the second substrates 30C are not parallel to each other.

Furthermore, the plurality of first substrates 30B have the same shape, and the plurality of second substrates 30C also have the same shape.

Furthermore, the plurality of first substrates 30B and the plurality of second substrates 30C have different shapes.

Furthermore, as shown in FIG. 26A, the first substrates 30B are formed such that the height HB2 of any one E2 of both ends E1 and E2 of each of the first substrates 30B is higher than the height HB1 of the other end E1 when the first substrates 30B are viewed toward a plane perpendicular to the first direction.

In addition, as shown in FIG. 26B, the second substrates 30C are formed such that the height HC2 of any one E2 of both ends E1 and E2 of each of the second substrates 30C is higher than the height HC1 of the other end E1 when the second substrates 30C are viewed toward a plane perpendicular to the first direction.

In this case, since the first substrates 30B and the second substrates 30C have different shapes, HB1*HC1 and HB2*HC2. Alternatively, HB1*HC1 and HB2=HC2, and HB1=HC1 and HB2*HC2.

Meanwhile, the reflective units 20 may be formed on the lower base substrate 30A, the first substrates 30B, and the second substrates 30C using, for example, a mask deposition method or an adhesive bonding method. Since this is known in the prior art and is not a direct target of the present invention, a detailed description thereof will be omitted.

When the stacking of all the second substrates 30C is completed as described above, the upper base substrate 30D is bonded and stacked on the uppermost one of the second substrates 30C, thereby forming the optical means base material 30E as shown in FIGS. 24 and 25.

In this case, the adhesion between the individual substrates of the lower base substrate 30A, the first substrates 30B, the second substrates 30C, and the upper base substrate 30D is performed by, for example, a method of applying an adhesive between the substrates and tightly fixing both substrates together. Since this is also known in the prior art and is not a direct target of the present invention, a detailed description thereof will be omitted.

Furthermore, the lower base substrate 30A, the first substrates 30B, the second substrates 30C, and the upper base substrate 30D are preferably made of a glass or plastic material having the same refractive index.

Once the optical means base material 30E has been formed through the above process, it is cut to form the optical means 30.

In other words, as shown in FIG. 27, the optical means base material 30E is cut in directions parallel to the first direction along two parallel straight lines L1 and L2 that allow the reflective units 20 to be all included therebetween when the optical means base material 30E is viewed toward a plane perpendicular to the first direction in which the reflective units 20 are arranged.

In this case, when the surfaces cut in the directions parallel to the first direction along the two straight lines L1 and L2 are the first and second surfaces 31 and 32 of the optical means 30 as described above and the optical means 30 is disposed such that the pupil 50 is located in the normal direction perpendicular to the two straight lines L1 and L2, the optical device 300 for augmented reality in the form of FIG. 7 is obtained as an example.

Accordingly, an inclination angle that each of the reflective units 20 has with respect to a forward direction from the pupil 50 (the x-axis direction in FIG. 7) may be defined by the boundary surfaces of the individual substrates 30A, 30B, and 30C.

Then, the optical means base material 30E is cut again in directions parallel to the first direction along the two straight lines L3 and L4 to finally form the optical means 30. In this case, the surfaces cut in the directions parallel to the first direction along the two straight lines L3 and L4 become surfaces corresponding to the top and bottom surfaces of the optical means 30 when the optical means 30 is placed in front of the pupil 50.

Figure 6:
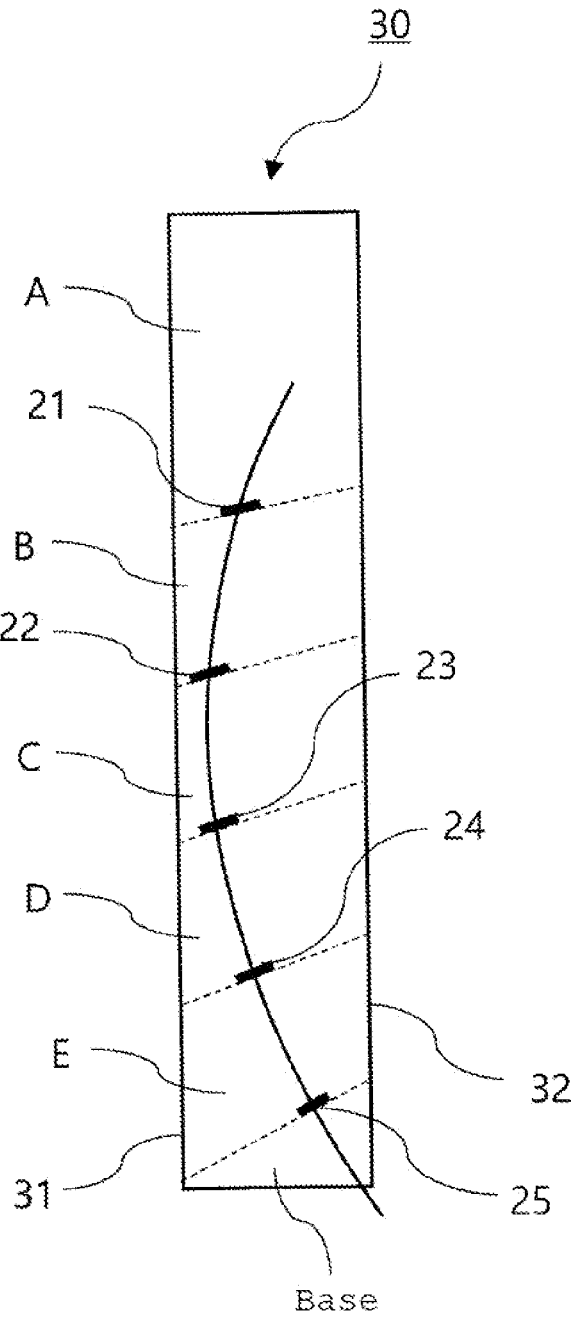
FIG. 6 is a diagram illustrating a process of manufacturing an optical means (30) used in the optical device (200) for augmented reality of FIG. 5.

According to this manufacturing method, the optical means 30 may be fabricated using the plurality of first substrates 30B having the same shape and the plurality of second substrates 30C having the same shape. Accordingly, the manufacturing process is simple compared to the conventional manufacturing method described above in conjunction with FIG. 6, and thus there is the advantage of significantly reducing the defect rate.

Meanwhile, although a method of forming the reflective units 20 on the lower base substrate 30A, sequentially bonding and stacking the first substrates 30B while forming the reflective units 20 on each of the plurality of first substrates 30B, and sequentially bonding and stacking the second substrates 30C while forming the reflective units 20 on each of the plurality of second substrates 30C is used in the embodiment of FIGS. 23 to 27, this is illustrative.

For example, there may be used a method of forming the reflective units 30 on the substrates 30A, 30B, and 30C in advance and sequentially bonding and stacking the substrates 30A, 30B, and 30C on which the reflective units 30 have been formed.

Next, an optical device 800 for augmented reality according to still another embodiment of the present invention will be described with reference to FIGS. 28 to 30.

Figure 28:
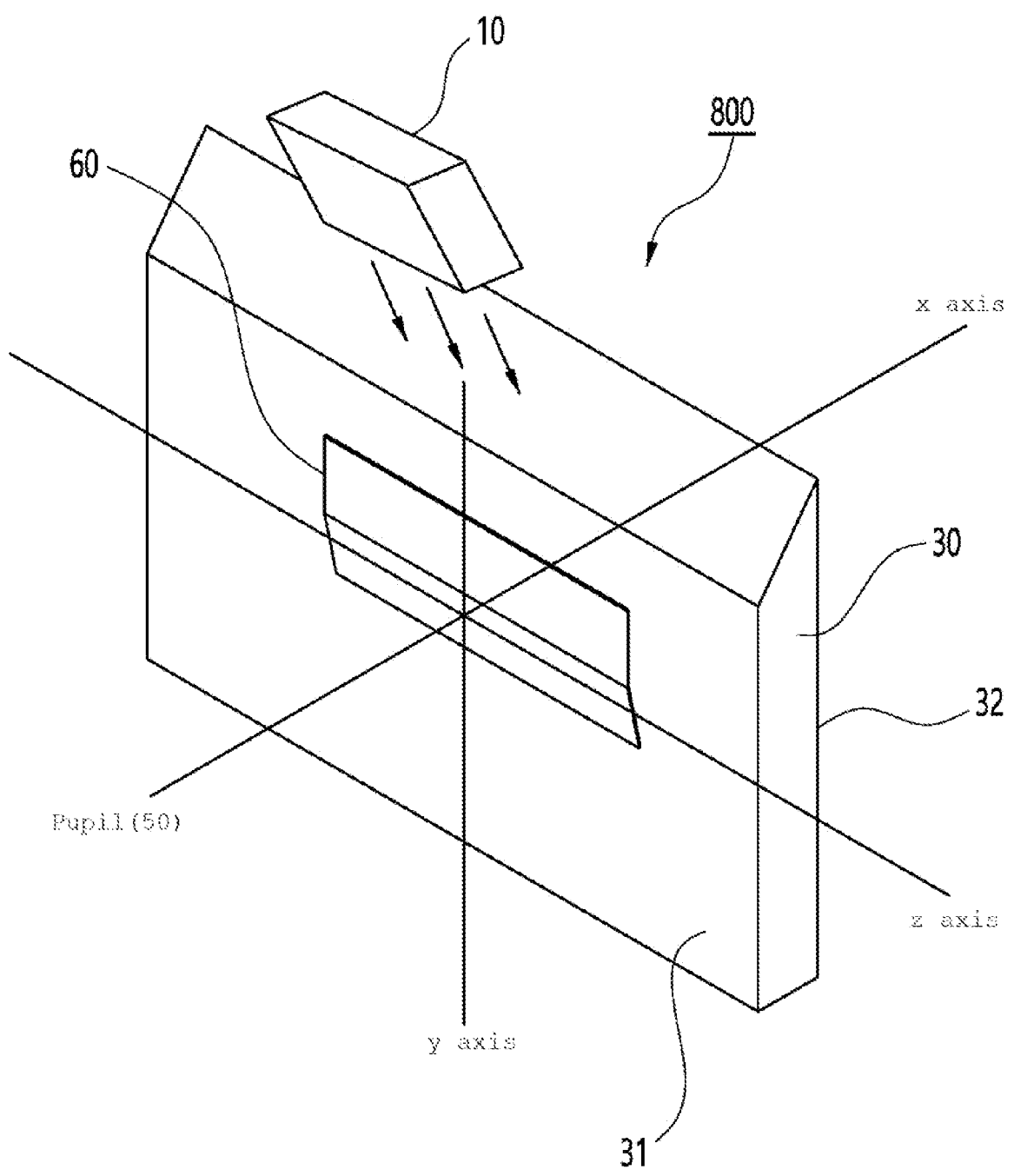
FIG. 28 is a perspective view when an optical device (800) for augmented reality according to still another embodiment of the present invention is placed in front of the pupil (50)
Figure 29:
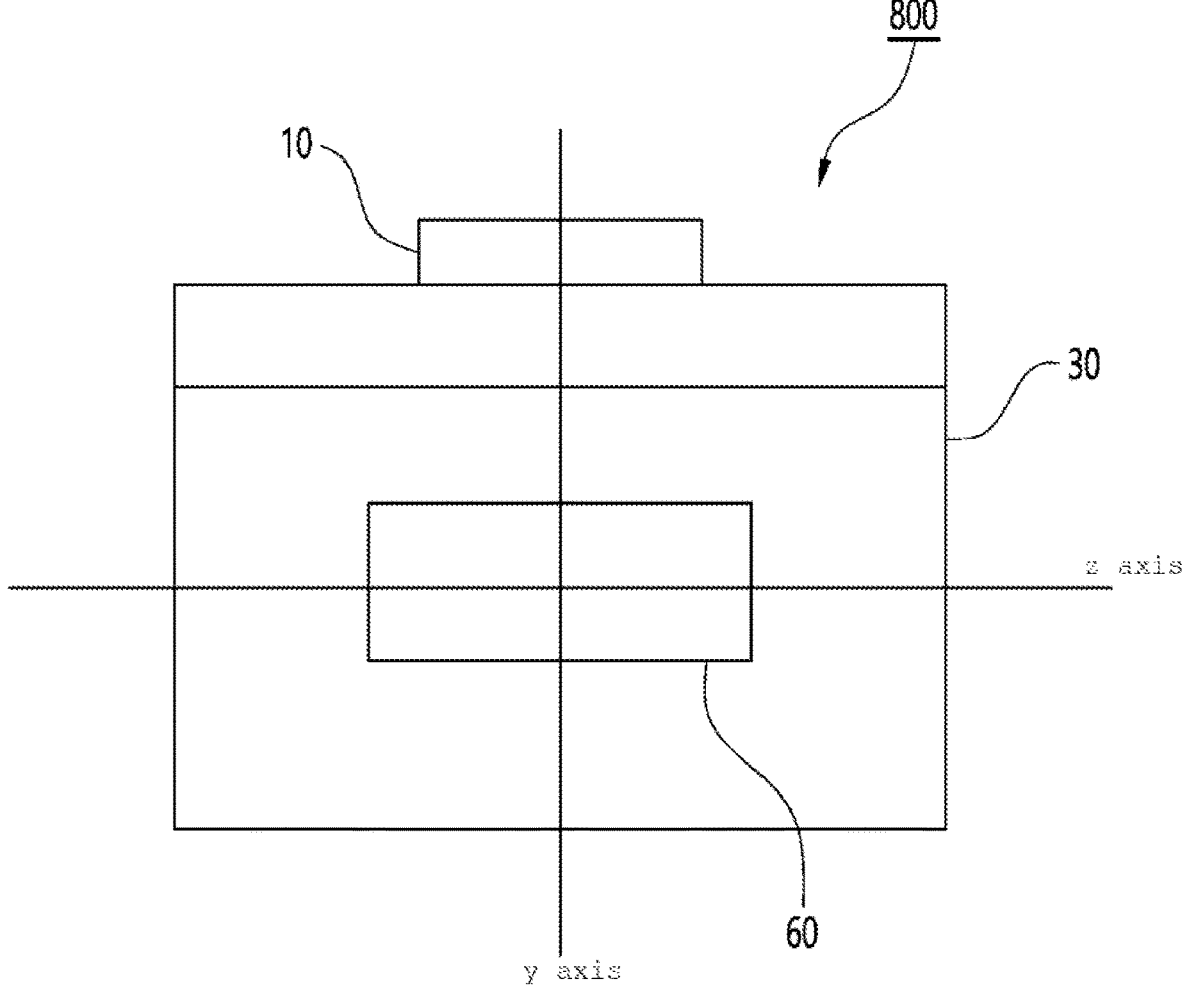
FIG. 29 is a front view when the optical device (800) for augmented reality according to the embodiment of the present invention is placed in front of the pupil (50)
Figure 30:
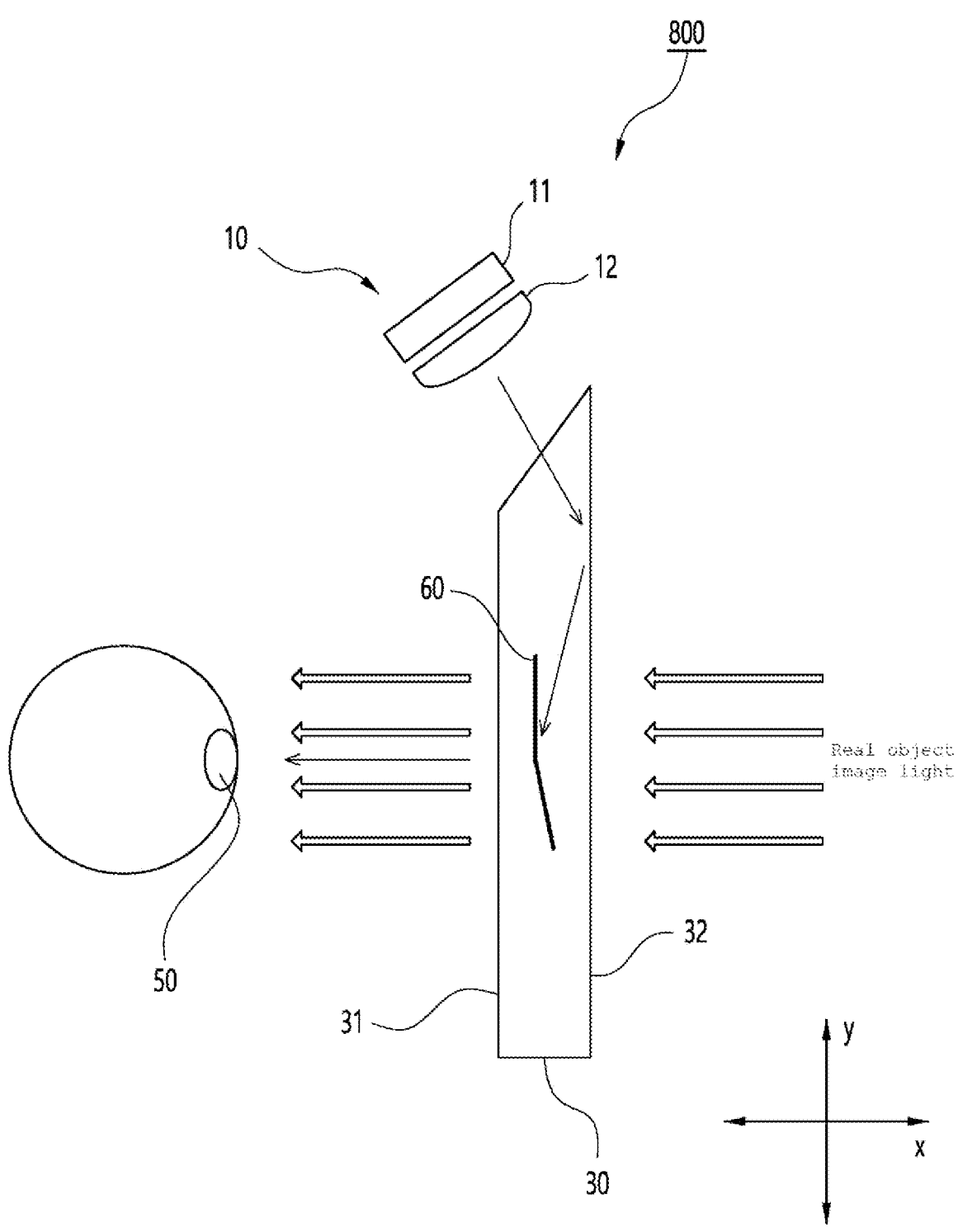
FIG. 30 is a side view when the optical device (800) for augmented reality according to the embodiment of the present invention is placed in front of the pupil (50)
Figure 31:
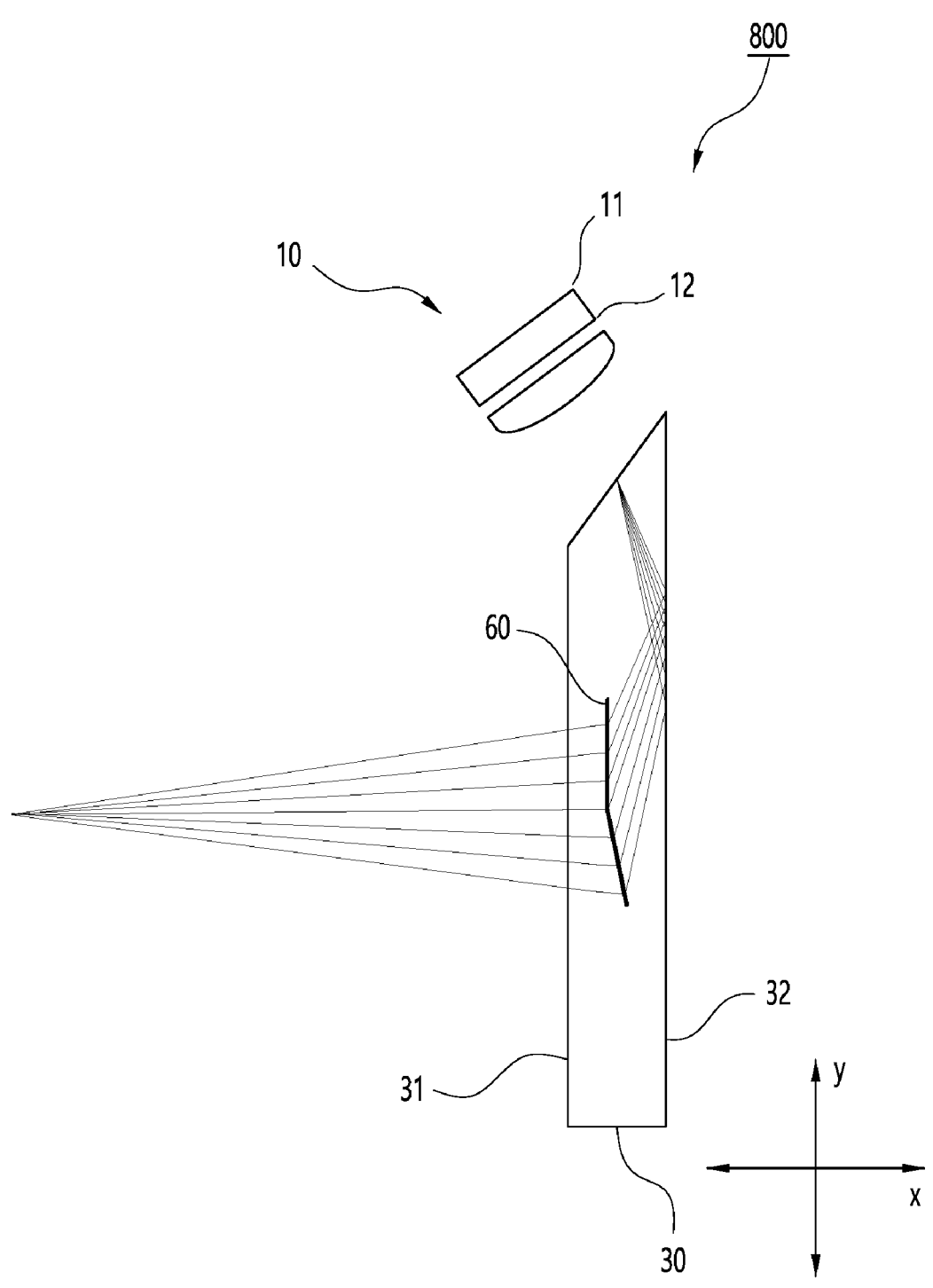
FIG. 31 shows optical paths in a side view when the optical device (800) for augmented reality according to the embodiment of the present invention is placed in front of the pupil (50).

FIGS. 28 to 31 are diagrams showing the optical device 800 for augmented reality having a reflective structure arranged in a straight line according to still another embodiment of the present invention, in which FIG. 28 is a perspective view when the optical device 800 for augmented reality is placed in front of the pupil 50, FIG. 29 is a front view when the optical device 800 for augmented reality is placed in front of the pupil 50, FIG. 30 is a side view when the optical device 800 for augmented reality is placed in front of the pupil 50, and FIG. 31 shows optical paths in a side view when the optical device 800 for augmented reality is placed in front of the pupil 50.

In the embodiment of FIGS. 28 to 31, an image output unit 10 and an optical means 30 are the same as described above, and there is a difference in that an optical element 60 is used instead of the plurality of reflective units 20.

In the embodiment of FIGS. 28 to 31, the optical element 60 is disposed inside the optical means 30 to provide a user with an image for augmented reality by transferring the augmented reality image light, output from the image output unit 10, toward the pupil 50 of a user's eye.

The optical element 60 has a spatial arrangement structure corresponding to an overall three-dimensional space plane constructed by connecting the plurality of reflective units 20 disposed in each of the optical devices 300 to 700 for augmented reality described in the above-described embodiments, and is formed of a diffractive optical element (DOE) or a holographic optical element (HOE).

As shown in FIGS. 28 to 31, the optical element 60 is formed in a single plane shape, and the single plane-shaped optical element is disposed inside the optical means 30 so that at least two straight lines that are not parallel to each other appear bent in a connected form when the optical means 30 is viewed in the z-axis direction.

Since the DOE or the HOE has the property of transmitting and reflecting real object image light, the optical element 60 may transfer augmented reality image light to the pupil 50, and simultaneously, may transfer real object image light to the pupil 50 by transmitting the real object image light therethrough. However, optical efficiency for real object image light may be somewhat lowered.

In the case where the optical element 60 is used, there are advantages in that it may provide a more uniform augmented reality image than the reflective units 20 of the above-described embodiments discontinuously arranged at regular intervals and the manufacturing process is considerably simplified because it may be fabricated using only two substrates formed by lines extending along the planar structure of the optical element 60.

Although the configuration of the present invention has been described with reference to the preferred embodiments of the present invention above, it is obvious that the present invention is not limited to the above-described embodiments and various modifications and alterations may be possible within the scope of the present invention.

For example, a method of attaching a concave or convex lens to the first surface 31 of the optical means 30 may be used for a refractive error user having nearsightedness or farsightedness. In this case, the attached concave or convex lens may be integrated with the optical means 30 or may be formed as a separate module and then detachably coupled to the optical means 30.

The invention claimed is:

1. An optical device for augmented reality having a reflective means arranged in a straight line, the optical device comprising:

a reflective means configured to transfer augmented reality image light, output from an image output unit, to a pupil of a user's eye by reflecting the augmented reality image light toward the pupil, thereby providing an image for augmented reality to the user; and an optical means configured such that the reflective means is buried and disposed therein, and also configured to transmit at least part of real object image light, output from a real object, therethrough toward the pupil of the user's eye;

wherein the optical means has a first surface through which the augmented reality image light reflected from the reflective means and the at least part of the real object image light are output toward the user's pupil, and a second surface which is opposite to the first surface and the real object image light enters;

wherein the reflective means includes a plurality of reflective units buried and disposed inside the optical means;

wherein the reflective means includes a plurality of reflective means, and the plurality of reflective means are arranged in parallel at intervals along a direction of the z-axis;

wherein, when the optical means is placed in front of the user's pupil and a forward direction from the pupil is set as an x axis, the image output unit is disposed outside or inside the optical means to be located on a straight line orthogonal to the x axis; and wherein, when any one of line segments passing between the first and second surfaces of the optical means while being parallel to a vertical line extending from the image output unit to the x axis along the x axis is set as a y axis and a line segment orthogonal to the x axis and the y axis is set as a z axis:

at least two of the plurality of reflective units form a first reflective unit group disposed inside the optical means so that centers thereof are located on a first straight line when the optical means is viewed from an outside toward a plane perpendicular to the z axis;

at least two of remaining reflective units excluding the reflective units forming the first reflective unit group among the plurality of reflective units form a second reflective unit group disposed inside the optical means so that centers thereof are located on a second straight line that is not parallel to the first straight line when the optical means is viewed from an outside toward a plane perpendicular to the z axis; and the reflective units forming the first reflective unit group are disposed inside the optical means to be located closer to the second surface of the optical means as a distance from the image output unit increases.

2. The optical device of claim 1, wherein the reflective units constituting the second reflective unit group have a same distance with respect to the second surface of the optical means regardless of a distance from the image output unit.

3. The optical device of claim 1, wherein the reflective units constituting the second reflective unit group are arranged closer to the second surface of the optical means as a distance from the image output unit decreases.

4. The optical device of claim 1, wherein the first straight line and the second straight line are included in any one plane perpendicular to the z axis.

5. The optical device of claim 1, wherein the augmented reality image light output from the image output unit is directly transferred to the plurality of reflective units through an inside of the optical means, or is reflected by total internal reflection on an inner surface of the optical means at least once and then transferred to the plurality of reflective units.

6. The optical device of claim 1, wherein each of the reflective means is arranged such that each of reflective units constituting each of the reflective means is located together with any one of reflective units constituting an adjacent reflective mean along an imaginary straight line parallel to the z axis.

7. The optical device of claim 1, wherein each of the reflective means is arranged such that each of reflective units constituting each of the reflective means is not located together with all reflective units constituting an adjacent reflective means along an imaginary straight line parallel to the z axis.

8. The optical device of claim 1, wherein the plurality of reflective units are formed in bar shapes extending along imaginary straight lines parallel to the z axis.

9. The optical device of claim 8, wherein the plurality of reflective units are formed to extend longer than a length of the image output unit in a direction of the z axis when the optical device for augmented reality is viewed in a direction of the x axis.

10. The optical device of claim 1, wherein the plurality of reflective means are arranged inside the optical means so that there is present at least one reflective means for which distances between the plurality of reflective units and the first surface of the optical means are not all the same.

11. The optical device of claim 1, wherein at least some of the plurality of reflective units are each formed of a half mirror or a refractive element.

12. The optical device of claim 1, wherein at least some of the plurality of reflective units are each coated with a material absorbing light without reflecting light on a surface thereof opposite to a surface thereof that reflects the augmented reality image light.

13. The optical device of claim 1, wherein surfaces of at least some of the plurality of reflective units are each formed as a curved surface.

14. The optical device of claim 1, wherein at least some of the plurality of reflective units are each formed of a diffractive optical element (DOE) or a holographic optical element (HOE).

15. A method for manufacturing the optical means of claim 1, the method comprising:

a first step of forming reflective units on a surface of a lower base substrate along a first direction;

a second step of sequentially bonding and stacking a plurality of first substrates on the surface of the lower base substrate, and forming reflective units on a surface of each of the plurality of first substrates along a direction parallel to the first direction;

a third step of, after the second step, sequentially bonding and stacking a plurality of second substrates on an uppermost one of the first substrates, and forming reflective units on a surface of each of the plurality of second substrates along a direction parallel to the first direction;

a fourth step of forming an optical means base material by bonding and stacking an upper base substrate on an uppermost one of the second substrates; and a fifth step of forming an optical means by processing the optical means base material;

wherein the second step includes forming reflective units on a surface of each of the first substrates so that a line connecting centers of reflective units formed on surfaces of the respective first substrates form a straight line when the first substrates are viewed from an outside toward a plane perpendicular to the first direction;

wherein the third step includes forming reflective units on a surface of each of the second substrates so that a line connecting centers of reflective units formed on surfaces of the respectively second substrates form a straight line when the second substrates are viewed from an outside toward a plane perpendicular to the first direction;

24 wherein the straight line connecting the centers of the reflective units formed on the first substrates and the straight line connecting the centers of the reflective units formed on the second substrates are not parallel to each other; and wherein the fifth step includes cutting the optical means base material in directions parallel to the first direction along two parallel straight lines that allow the reflective units to be all included therebetween when the optical means base material is viewed toward a plane perpendicular to the first direction.

16. The method of claim 15, wherein the plurality of first substrates have a same shape, and the plurality of second substrates have a same shape.

17. The method of claim 16, wherein the plurality of first substrates and the plurality of second substrates have different shapes.

18. The method of claim 17, wherein, when the optical means base material is viewed toward a plane perpendicular to the first direction, a height of any one of both ends of the plurality of first substrates and both ends of the plurality of second substrates is higher than that of a remaining end.

19. An optical device for augmented reality having an optical element arranged in a straight line, the optical device comprising:

an optical element disposed inside an optical means to transfer augmented reality image light, output from an image output unit, toward a pupil of a user's eye, thereby providing an image for augmented reality to the user; and the optical means configured such that the optical element is buried and disposed therein, and also configured to transmit at least part of real object image light, output from a real object, therethrough toward the pupil of the user's eye;

wherein the optical means has a first surface through which the augmented reality image light transferred through the optical element and the at least part of the real object image light are output toward the user's pupil, and a second surface which is opposite to the first surface and the real object image light enters;

wherein, when the optical means is placed in front of the user's pupil and a forward direction from the pupil is set as an x axis, the image output unit is disposed outside or inside the optical means to be located on a straight line orthogonal to the x axis; and wherein, when any one of line segments passing between the first and second surfaces of the optical means while being parallel to a vertical line extending from the image output unit to the x axis along the x axis is set as a y axis and a line segment orthogonal to the x axis and the y axis is set as a z axis:

the optical element is a diffractive optical element (DOE) or a holographic optical element (HOE), and the optical element is formed in a single bent plane shape, and is disposed inside the optical means so that at least two straight lines that are not parallel to each other appear in a connected form when the optical means is viewed in a direction of the z axis.

20. The optical device of claim 19, wherein the augmented reality image light output from the image output unit is directly transferred to the optical element through an inside of the optical means, or is reflected by total internal reflection on an inner surface of the optical means at least once and then transferred to the optical element.

* * * * *